United States Patent
Yasin

(10) Patent No.: US 12,204,430 B2
(45) Date of Patent: Jan. 21, 2025

(54) MONITORING PERFORMANCE COST OF EVENTS

(71) Applicant: Intel Corporation, Santa Clara, CA (US)

(72) Inventor: Ahmad Yasin, Haifa (IL)

(73) Assignee: Intel Corporation, Santa Clara, CA (US)

( * ) Notice: Subject to any disclaimer, the term of this patent is extended or adjusted under 35 U.S.C. 154(b) by 833 days.

(21) Appl. No.: 17/033,746

(22) Filed: Sep. 26, 2020

(65) Prior Publication Data

US 2022/0100626 A1    Mar. 31, 2022

(51) Int. Cl.
| | |
|---|---|
| *G06F 1/30* | (2006.01) |
| *G06F 9/30* | (2018.01) |
| *G06F 9/32* | (2018.01) |
| *G06F 9/54* | (2006.01) |
| *G06F 11/30* | (2006.01) |
| *G06F 11/34* | (2006.01) |

(52) U.S. Cl.
CPC ...... *G06F 11/3072* (2013.01); *G06F 9/30101* (2013.01); *G06F 9/321* (2013.01); *G06F 9/542* (2013.01); *G06F 11/3409* (2013.01)

(58) Field of Classification Search
None
See application file for complete search history.

(56) References Cited

U.S. PATENT DOCUMENTS

| | | | | |
|---|---|---|---|---|
| 9,465,680 | B1* | 10/2016 | Chynoweth | G06F 11/3466 |
| 2005/0076180 | A1* | 4/2005 | Alsup | G06F 9/3861 |
| | | | | 712/E9.055 |
| 2005/0273310 | A1* | 12/2005 | Newburn | G06F 11/348 |
| | | | | 714/E11.197 |
| 2007/0226470 | A1* | 9/2007 | Krimer | G06F 9/3838 |
| | | | | 712/225 |
| 2008/0168249 | A1* | 7/2008 | Hirzel | G06F 12/0253 |
| | | | | 711/170 |
| 2008/0177756 | A1* | 7/2008 | Kosche | G06F 11/3476 |
| 2010/0169611 | A1* | 7/2010 | Chou | G06F 9/3863 |
| | | | | 712/205 |
| 2013/0042155 | A1* | 2/2013 | Millet | G06F 11/3648 |
| | | | | 714/45 |

(Continued)

OTHER PUBLICATIONS

International Preliminary Report on Patentability, PCT App. No. PCT/US2021/047591, Apr. 6, 2023, 7 pages.

(Continued)

*Primary Examiner* — Adam Lee
(74) *Attorney, Agent, or Firm* — Nicholson De Vos Webster & Elliott LLP

(57) ABSTRACT

Embodiments are disclosed for monitoring processor performance, including cost of events. In an embodiment, a processor includes a first counter, a second counter, a handler circuit, and an enable circuit. The first counter is to count occurrences of an event in the processor and to overflow upon the count of occurrences reaching a specified value. The second counter to measure a performance cost of the event. The handler circuit to generate and an event sampling record. The record is to include at least one value reflecting the performance cost. The enable circuit is to enable the handler circuit to generate the record.

20 Claims, 18 Drawing Sheets

(56) References Cited

U.S. PATENT DOCUMENTS

| | | | | |
|---|---|---|---|---|
| 2013/0219389 A1* | 8/2013 | Serebrin | ............ | G06F 9/45533 718/1 |
| 2013/0332933 A1* | 12/2013 | Knauth | ................... | G06F 9/54 718/102 |
| 2014/0013091 A1* | 1/2014 | Yasin | ................... | G06F 9/3861 712/244 |
| 2014/0075052 A1* | 3/2014 | Kris | ...................... | G06F 3/05 710/5 |
| 2014/0143781 A1* | 5/2014 | Yao | ...................... | G06F 9/5016 718/100 |
| 2014/0164723 A1* | 6/2014 | Garthwaite | ............ | G06F 9/461 711/162 |
| 2014/0229715 A1* | 8/2014 | Knauth | ............... | G06F 11/3471 712/221 |
| 2015/0127983 A1* | 5/2015 | Trobough | ........... | G06F 11/2733 714/30 |
| 2015/0347267 A1* | 12/2015 | Combs | ................ | G06F 11/348 714/47.2 |
| 2016/0179541 A1* | 6/2016 | Gramunt | ............... | G06F 9/3856 712/208 |
| 2017/0220447 A1* | 8/2017 | Brandt | ............... | G06F 11/3466 |
| 2017/0262290 A1* | 9/2017 | Yasin | ................... | G06F 11/3466 |
| 2017/0371769 A1* | 12/2017 | Merten | ................ | G06F 11/301 |
| 2018/0004521 A1* | 1/2018 | Kleen | ................ | G06F 9/30145 |
| 2018/0004628 A1* | 1/2018 | Strong | ................ | G06F 9/3877 |
| 2018/0088861 A1* | 3/2018 | Yasin | ................... | G06F 3/0683 |
| 2019/0026352 A1* | 1/2019 | Marathe | ................ | G06F 16/907 |
| 2019/0041950 A1 | 2/2019 | Chynoweth et al. | | |
| 2020/0026687 A1* | 1/2020 | Ben Dayan | .......... | G06F 16/134 |
| 2020/0210320 A1* | 7/2020 | Strong | ............... | G06F 11/3636 |

OTHER PUBLICATIONS

International Search Report and Written Opinion, PCT App. No. PCT/US2021/047591, Dec. 23, 2021, 10 pages.

European search report and Search Opinion, EP App. No. 21873159.4, Sep. 24, 2024, 06 pages.

\* cited by examiner

FIG. 5
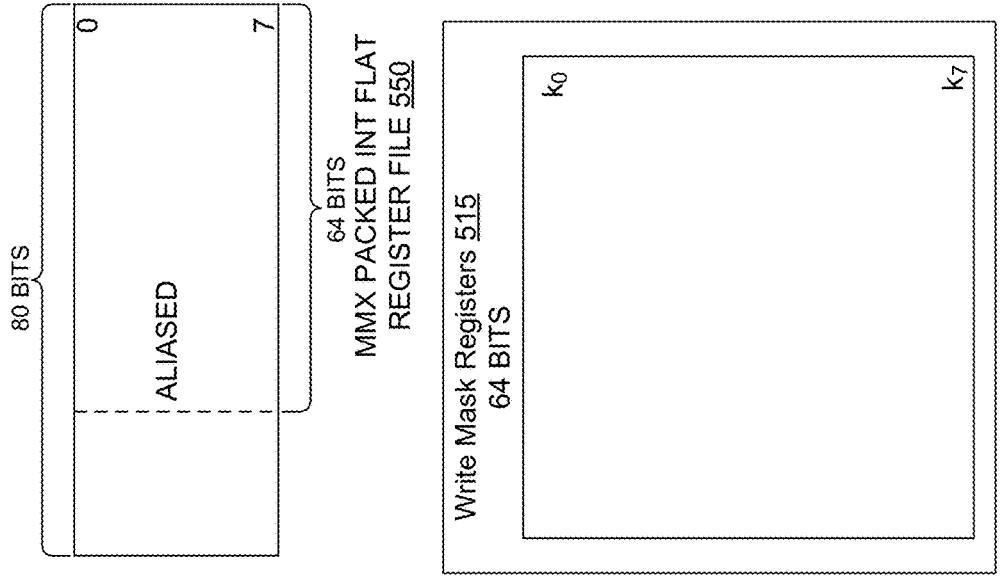
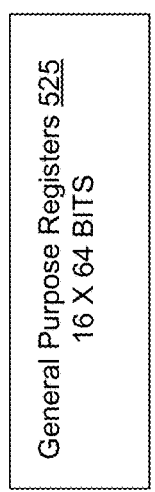

| Offset | Groupname | Fieldname | Bit | Src/Dst/Both | | |
|---|---|---|---|---|---|---|
| | Basic | Record Format | | | Record Size | |
| | | Instruction Pointer | [47:0] | | [63:48] | EventingRIP |
| | | TSC | | | | |
| | | Applicable Counters | [47:0] | | [63:48] | |
| | | "Event Cost" | | | | |

FIG. 6

| Key | Level1 | Level2 | Level3 | Level4 | Level5 |
|---|---|---|---|---|---|
| FE | Frontend_Bound | | | | |
| FE | | Frontend_Latency | | | |
| FE | | | ICache_Misses | | |
| FE | | | ITLB_Misses | | |
| FE | | | | Code_STLB_Hit | |
| FE | | | | Code_STLB_Miss | |
| FE | | | Branch_Resteers | | |
| FE | | | | Mispredicts_Resteers | |
| FE | | | | Clears_Resteers | |
| FE | | | | Unknown_Branches | |
| FE | | | DSB_Switches | | |
| FE | | | LCP | | |
| FE | | | MS_Switches | | |
| FE | | Frontend_Bandwidth | | | |
| FE | | | MITE | | |
| FE | | | DSB | | |
| FE | | | LSD | | |
| BAD | Bad_Speculation | | | | |
| BAD | | Branch_Mispredicts | | | |
| BAD | | Machine_Clears | | | |
| BE | Backend_Bound | | | | |
| BE/Mem | | Memory_Bound | | | |
| BE/Mem | | | L1_Bound | | |
| BE/Mem | | | | DTLB_Load | |
| BE/Mem | | | | | Load_STLB_Hit |
| BE/Mem | | | | | Load_STLB_Miss |
| BE/Mem | | | | Store_Fwd_Blk | |
| BE/Mem | | | | Lock_Latency | |
| BE/Mem | | | | Split_Loads | |
| BE/Mem | | | | 4K_Aliasing | |
| BE/Mem | | | | FB_Full | |
| BE/Mem | | | L2_Bound | | |
| BE/Mem | | | L3_Bound | | |
| BE/Mem | | | | Contested_Accesses | |
| BE/Mem | | | | Data_Sharing | |
| BE/Mem | | | | L3_Hit_Latency | |
| BE/Mem | | | | SQ_Full | |
| BE/Mem | | | DRAM_Bound | | |
| BE/Mem | | | | MEM_Bandwidth | |
| BE/Mem | | | | MEM_Latency | |
| BE/Mem | | | | | Local_DRAM |
| BE/Mem | | | | | Remote_DRAM |
| BE/Mem | | | | | Remote_Cache |
| BE/Mem | | | PMM_Bound | | |
| BE/Mem | | | Store_Bound | | |
| BE/Mem | | | | Store_Latency | |
| BE/Mem | | | | False_Sharing | |
| BE/Mem | | | | Split_Stores | |
| BE/Mem | | | | DTLB_Store | |
| BE/Mem | | | | | Store_STLB_Hit |
| BE/Mem | | | | | Store_STLB_Miss |

FIG. 7

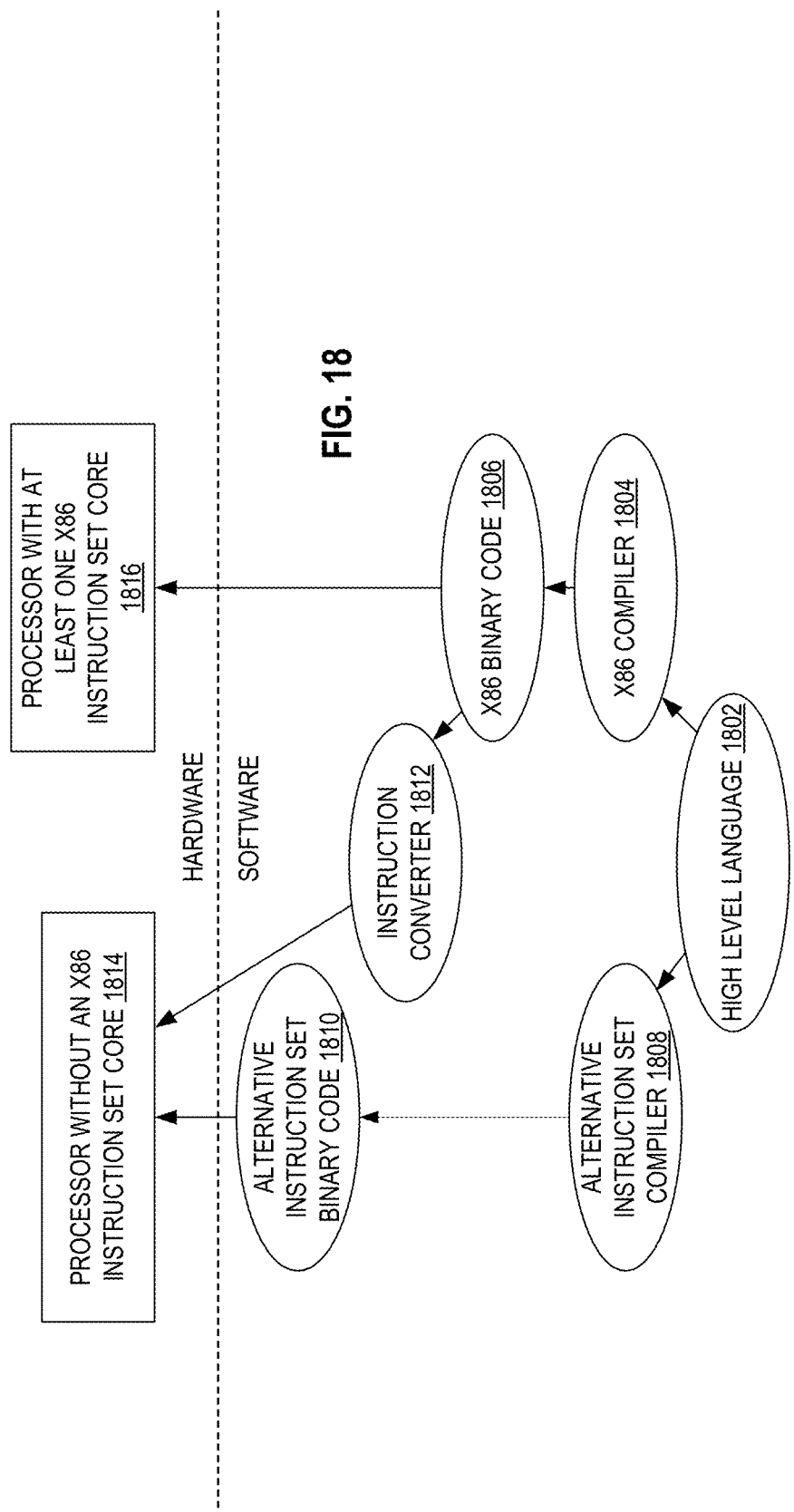

MONITORING PERFORMANCE COST OF EVENTS

TECHNICAL FIELD

Embodiments described herein generally relate to monitoring performance of computer processors. In particular, embodiments described generally relate to monitoring performance cost of events.

BACKGROUND

Performance monitoring (e.g., using technologies such as Precise Event Based Sampling (PEBS) from Intel Corporation) of a processor can be used for characterizing, debugging, and tuning software and program code. However, the profiling data volumes may be huge. High performance processors go to great lengths to keep their execution pipelines busy, applying techniques such as large-window out-of-order execution, predictive speculation, and hardware prefetching. These techniques complicate the software tuning task and lead to varying cost for commonly monitored events.

BRIEF DESCRIPTION OF THE DRAWINGS

The various advantages of the embodiments disclosed herein will become apparent to one skilled in the art by reading the following specification and appended claims, and by referencing the drawings, in which:

FIG. 5 is a block diagram of a register architecture according to an embodiment;

FIG. 6 shows an example of a PEBS record including timed PEBS cost according to an embodiment;

FIG. 7 shows a top-down Microarchitectural Analysis tree for which heuristics may be fixed according to embodiments;

FIG. 18 is a block diagram contrasting the use of a software instruction converter to convert binary instructions in a source instruction set to binary instructions in a target instruction set according to embodiments of the invention.

DETAILED DESCRIPTION

Figure 1:
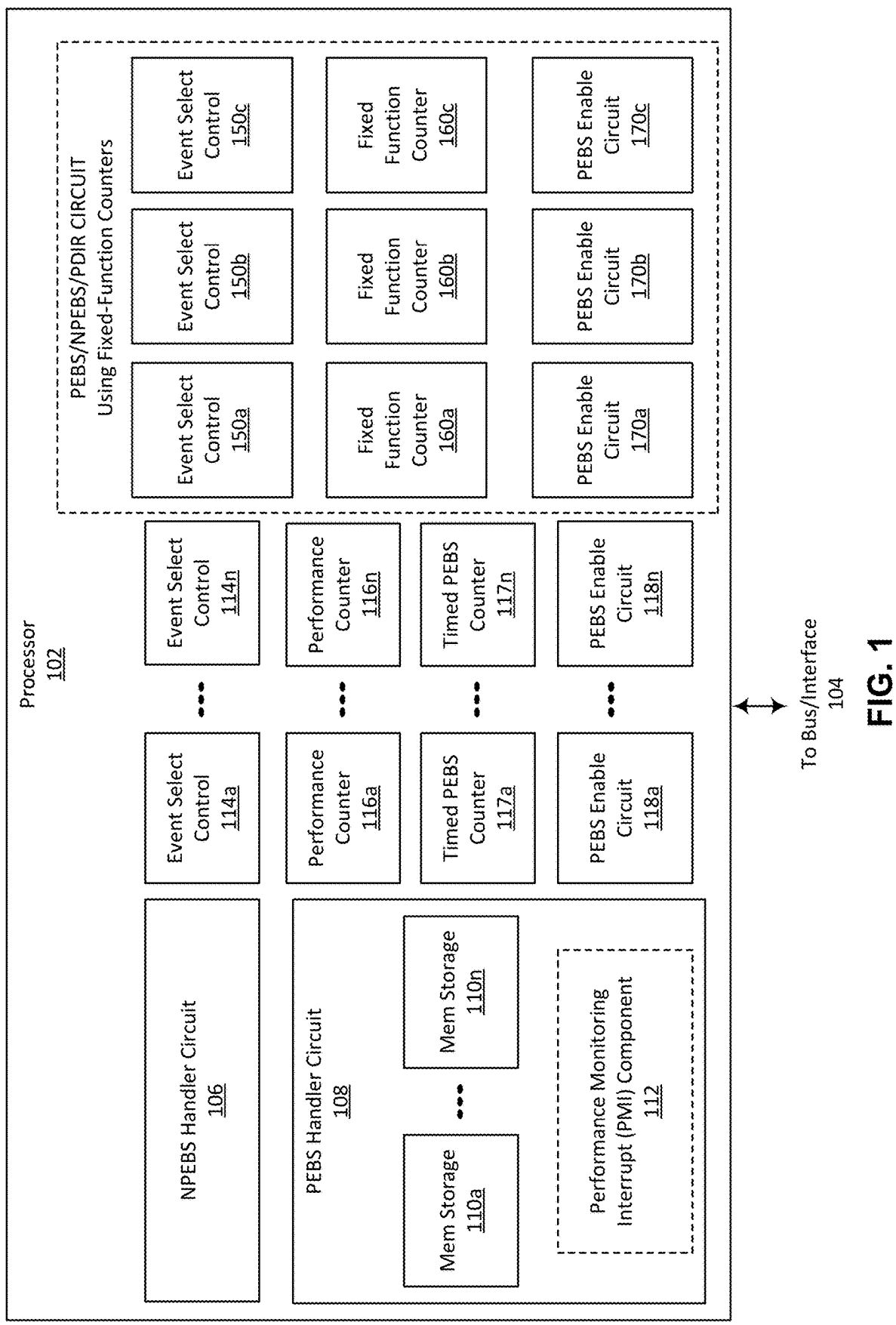
FIG. 1 is a block diagram illustrating a processor according to one embodiment.

In the following description, numerous specific details are set forth. However, it is understood that embodiments of the disclosure may be practiced without these specific details. In other instances, well-known circuits, structures and techniques have not been shown in detail to not obscure the understanding of this description.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not ne lecessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As used in this specification and the claims and unless otherwise specified, the use of the ordinal adjectives "first," "second," "third," etc. to describe an element merely indicates that a particular instance of an element or different instances of like elements are being referred to, and is not intended to imply that the elements so described must be in a particular sequence, either temporally, spatially, in ranking, or in any other manner. Also, as used in descriptions of embodiments of the invention, a "/" character between terms may mean that what is described may include or be implemented using, with, and/or according to the first term and/or the second term (and/or any other additional terms).

Also, the terms "bit," "flag," "field," "entry," "indicator," etc., may be used to describe any type or content of a storage location in a register, table, database, or other data structure, whether implemented in hardware or software, but are not meant to limit embodiments of the invention to any particular type of storage location or number of bits or other elements within any particular storage location. The term "clear" may be used to indicate storing or otherwise causing the logical value of zero to be stored in a storage location, and the term "set" may be used to indicate storing or otherwise causing the logical value of one, all ones, or some other specified value to be stored in a storage location; however, these terms are not meant to limit embodiments of the present invention to any particular logical convention, as any logical convention may be used within embodiments of the invention.

Embodiments of the invention provide performance cost (e.g., time. latency) information for monitored events. In embodiments, existing performance monitoring architectures (e.g., PEBS from Intel Corporation, Instruction Based Sampling (IBS) from AMD Corporation, Statistical Profiling Extension from ARM) may be extended by using memory buffers (e.g., in PEBS) or processor registers (e.g., in IBS) to provide time in addition to the information (e.g., instruction pointer, data address) collected for monitored events. For convenience and to provide examples, this specification may use the term "PEBS" and/or "timed PEBS" in descriptions of embodiments; however, embodiments are not limited to PEBS or using time to measure performance cost.

For example, for MEM_LOAD_RETIRED.L3_HIT, the time would be the retirement push-out induced by the instruction to which the load that hit in the level 3 (L3) cache belongs. Embodiments may allow software to sort samples of an event based on its impact to the overall performance. For example, a load that hit an L3-cache that is part of a sequential access pattern is less likely to impact performance than a load that is part of a random access pattern.

Embodiments may provide precise performance cost in the number of elapsed retirement cycles, which may be preferred over approaches that provide some bucketing (e.g., per load data-source or branch mispredict type) that may indirectly point to range of potential cost.

Embodiments may provide cost at instruction level granularity, e.g., the performance cost for the particular instruction for which the event fires, which may be preferred over approaches that may do so for a sequence of instructions with no taken branches (sometimes called "hyper-block" which may be a quite long sequence of instruction) for some compiler generated codes.

Embodiments may provide top-down oriented cost, e.g., by adding performance cost information to generic events (e.g., INST_RETIRE.ANY, BR_MISP_RETIRED.ALL_BRANCHES, ASSISTS.ANY) which may be preferred over approaches with a small number of precise events in a bottom-up fashion that may limit the ability to cover a spectrum of performance.

Embodiments may provide sampling without blind spots because a time cost may be providing for any precise event for any of its occurrences, which may be preferred over approaches that pre-select certain transactions for monitoring each time.

Embodiments may be used to optimize a software stack and tune software to hardware, for example by measuring the performance cost of instruction cache misses such that the cost of instruction cache misses may be mitigated by inserting of software prefetch instructions.

Precise and Non-Precise Event Based Sampling (Pebs and Npebs)

The performance monitoring capability employed in some embodiments may be built upon three sets of event counters: fixed function counters, general purpose counters, and timed PEBS counters. In embodiments, three fixed function counters may be defined and implemented to count instructions retired, reference clocks, and core clocks. The general-purpose counters and timed PEBS counters may be defined and implemented as described below. In embodiments, any number of general-purpose counters may each be associated with a corresponding timed PEBS counter. In embodiments, any number of timed PEBS counters may be available for use in connection with monitoring events (e.g., Load STLB hit) that may not be defined and/or selectable as PEBS events according to a previous PEBS architecture.

As used herein, a precise event is a performance event that is linked to a specific instruction or micro-operation in an instruction trace and occurs when that instruction or micro-operation retires. Such precise events may include, but are not limited to, instructions retired, branch instructions retired, cache references, or cache misses, to name just a few examples. On the other hand, a non-precise event is a performance event that is either not linked to a specific instruction or micro-operation in an instruction trace or can occur speculatively even when the instruction or micro-operation does not retire. By way of example, a non-precise event may include, but is not limited to, reference clock ticks, core clock ticks, cycles when interrupts are masked, to name just a few examples.

In some embodiments, performance of a processing device is monitored to manage events and measure their impact on performance. In some embodiments, the processing device tracks precise and non-precise events and stores architectural and micro-architectural metadata regarding the events in a non-intrusive manner utilizing a mechanism on the processing device without the intervention of a performance monitoring interrupt (PMI).

The operation of a processing device may include the occurrences of a plurality of events that monitor performance of the system. An event may include any operation, occurrence, or action in a processor. In embodiments, the event is a response to a given instruction and data stream in the processing device. The events may be associated with architectural metadata including state information of the processing device including, but not limited to, an instruction pointer, a time stamp counter, and register state. The events may also be generic events (e.g., INST_RETIRED) that may be tagged with a performance cost.

In embodiments, a performance counter is configured to count one or more types of events. While the counter is incrementing or decrementing, software reads the counter at selected intervals to determine the number of events that have been counted between the intervals. The counter may be implemented in multiple ways. In embodiments, the counter decrements from a positive starting value, overflowing when the count reaches zero. In other embodiments, the counter starts at a zero value and increments the count of occurrences until it overflows at a specified value. In other embodiments, the counter starts at a negative value, and increments until it overflows upon reaching zero. The performance counter may generate a performance record or a performance monitoring interrupt (PMI) when the counter overflows. To trigger an overflow, the counter may be preset to a modulus value that may cause the counter to overflow after a specific number of events have been counted, which generates either a PMI or a performance record, such as a precise event based sampling (PEBS) record.

A performance record, as further described below, may include a performance cost or penalty metric that would help to rank criticality of events to performance. In embodiments, the cost may be measured in the retirement push-out time induced by the event.

Embodiments may include new (e.g., not defined and/or selectable as PEBS events according to a previous PEBS architecture) precise events (e.g., for STLB-hit retired load/stores, BR_MISP_RETIRED.PLUS_ONE (fires on the first instruction after a branch misprediction) and/or upgrading events (MACHINE_CLEARS) to precise.

Tracking Precise Events

There are several types of mechanisms for monitoring and managing various events. One type is a PEBS mechanism, which functions to monitor and manage precise events. A precise event is a performance event that is linked to a specific instruction or micro-operation in an instruction trace and occurs when that instruction or micro-operation retires. Such precise events may include, but are not limited to, instructions retired, branch instructions retired, cache references, or cache misses, to name just a few examples. The PEBS mechanism may include several components, such as an event select (ES) control, a performance counter, a PEBS enable circuit and a PEBS handler circuit. The ES control may be programmed with an event identifier, which causes a performance counter corresponding to the ES control to start tracking (e.g., counting occurrences of) the programmed event corresponding to the event identifier.

Embodiments may also include a PEBS enable circuit of the processing device that controls when a PEBS record is generated. When the PEBS enable circuit is activated, a PEBS record is stored in a memory of the PEBS handler circuit upon overflow of the performance counter corresponding to the PEBS enable circuit. In embodiments, a user (e.g., software) may activate or set the PEBS enable circuit. A PEBS record may include architectural metadata of a state of the system upon the overflow of the performance counter. Such architectural metadata may include, but is not limited to, an Instruction Pointer (IP), Time Stamp Counter (TSC) and register state. As such, the PEBS record not only allows the location of the precise events in the instruction trace to be accurately profiled, but also provides additional information for use in software optimization, hardware optimization, performance tuning, etc.

A PEBS record may also include micro-architectural information that may measure the performance cost of events. For example, in the case of MEM_LOAD_RETIRED.L3_MISS (demand load accesses missing the L3 cache), the PEBS record may include a performance cost or penalty metric that would help to rank criticality of misses at different IPs.

Tracking Non-Precise Events

Embodiments may further utilize the PEBS mechanism to track and manage non-precise events of a processing device. A non-precise event is a performance event that is either not linked to a specific instruction or micro-operation in an instruction trace or can occur speculatively even when the instruction or micro-operation does not retire. By way of example, a non-precise event may include, but is not limited to, reference clock ticks, core clock ticks, cycles when interrupts are masked, and so on.

Some embodiments introduce a non-precise event based sampling (NPEBS) handler circuit of the processing device that allows an NPEBS handler circuit to generate a NPEBS record for programmed non-precise events and stores this NPEBS record for the non-precise event in the PEBS memory buffer of the PEBS handler circuit.

In embodiments, the NPEBS record shares the same format as the PEBS record. In other embodiments, the NPEBS record is formatted differently from the PEBS record.

The PEBS handler circuit and the NPEBS handler circuit may share some circuitry. The NPEBS handler circuit may use the resources of the PEBS handler circuit, differing from the PEBS handler circuit only in name. In an example, when the ES control is programmed with a non-precise event identifier, the performance counter associated with the ES control and the PEBS enable circuit tracks the programmed non-precise event. In embodiments, the NPEBS handler circuit is coupled to the PEBS enable circuit, which is coupled to the performance counter such that when the performance counter overflows, the PEBS enable circuit causes the NPEBS handler circuit to generate the NPEBS record for the non-precise event. Accordingly, the architectural metadata associated with the non-precise event is captured without requiring a PMI.

In embodiments, the NPEBS handler circuit controls timing of the generation of the NPEBS record for the non-precise event. In embodiments, the NPEBS record for the non-precise event is generated immediately upon occurrence of the overflow of the performance counter tracking the non-precise event. In other embodiments, the NPEBS record for the non-precise event is generated immediately after the occurrence of the overflow of the performance counter tracking the non-precise events (e.g., upon execution of next subsequent instruction). In embodiments, the NPEBS handler circuit stores the NPEBS record for the non-precise event in memory storage of the NPEBS handler circuit.

Some embodiments include compact circuits, and therefore are implemented as an integral part of a wide range of processing units without incurring significant increase of cost and power consumption. Some embodiments are programmable circuit logics and are used to track and manage different types of non-precise events on the same circuit logic. The NPEBS handler circuit is also extensible to track multiple processing units. The NPEBS handler circuit may be shared by a plurality of applications running on a same processor and managed by an operating system (OS) or a virtual machine as a shared resource.

Exemplary Processor to Generate and Store Pebs and Npebs Records

FIG. 1 is a block diagram illustrating a processor to generate and store PEBS and NPEBS records according to embodiments. Any or all of the blocks shown in FIG. 1 may represent circuitry and/or logic in a performance management unit (PMU) of the processor.

In FIG. 1, processor 102 (which may correspond to processor 1202 in FIG. 12 or any other processor/core shown in the Figure) includes an NPEBS handler circuit 106 and a PEBS handler circuit 108 having one or more memory storages 110*a* to 110*n* (which may be implemented as physical memory storage such as a buffer). The PEBS handler circuit 108 may also include a performance monitoring interrupt (PMI) component 112 as described above. In addition, the processor 102 may include one or more event select (ES) controls 114*a* to 114*n* corresponding to one or more general purpose performance counters 116*a*-116*n* and further corresponding to one or more PEBS enable circuits 118*a*-118*n* (details of which are described above). In some implementations, PEBS enable circuits 118*a*-118*n* may be located in a single control register (e.g., machine specific register or MSR).

In addition, in the embodiment shown in FIG. 1, PEBS, NPEBS, and Precise Distribution of Instructions Retired (PDIR) operations are applied using fixed function counters 160*a*-*c*. In embodiments, the three fixed function counters 160*a*-*c* are defined and implemented to count instructions retired, reference clocks, and core clocks. It will be appreciated, however, that the underlying principles of the invention are not limited to any particular number of fixed function counters or any particular fixed function counter implementation.

As mentioned, the processor 102 may execute a stream of instructions that may be embedded with markers for events that may be placed on a bus/interconnect fabric 104. The execution of a segment of instructions may constitute one or more non-precise events. A non-precise event is a performance event that is either not linked to a specific instruction or micro-operation in an instruction trace or can occur speculatively when the instruction or micro-operation does not retire. Such non-precise events may include, but are not limited to, reference clocks, core clocks and cycles, to name a few examples. In embodiments, the non-precise event is generated by the processor 102. In embodiments, the non-precise event is generated outside the processor 102 and communicated to the processor via the bus/interconnect fabric 104.

In embodiments, event select (ES) controls 150*a-c* shown in FIG. 1 perform similar operations to ES controls 114*a-c* described above but correspond to the fixed function performance counters 160*a-c* and further correspond to PEBS enable circuits 170*a-c* associated with the fixed function counters 160*a-c*. In embodiments, the PEBS enable circuits 118*a*-118*n* and 170*a-c* are located in a single control register.

Figure 8:
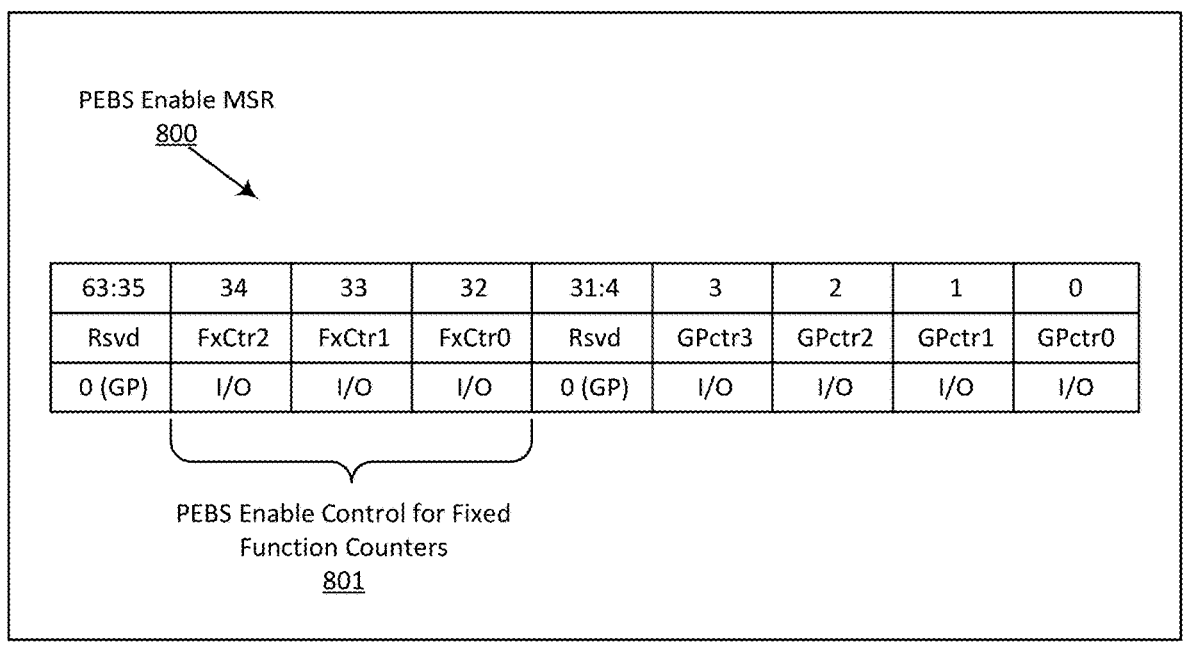
FIG. 8 illustrates different registers for enabling event-based sampling on a fixed function counter in accordance with an embodiment.

For example, FIG. 8 illustrates an exemplary PEBS enable machine specific register 800, abbreviated as PEBS enable MSR 800, in which bits 0-3 are associated with four general purpose counters, GPctr0-GPctr3, and bits 32-34 are associated with fixed function performance counters, FxCtr0-FxCtr2, respectively. In one embodiment, a bit value of 1 in any one of the bit positions 0-3 enables the corresponding general purpose counter for (N) PEBS and a value of 1 in any of the bit positions 32-34 enables the corresponding fixed function counter for (N) PEBS. Of course, the particular bit used for enabling (N) PEBS is not pertinent to the underlying principles of the invention. For example, in an alternative implementation, a bit value of 0 is used to indicate that the corresponding counter is enabled for (N) PEBS.

In one embodiment, the programming of the ES controls 150*a-c* causes a performance counter 160*a-c* corresponding to the programmed ES control to track occurrences of the particular programmed non-precise/precise event. In some embodiments, any event that is not defined as a precise event is considered a non-precise event. In one embodiment, the ES control 150*a-c* is programmed by an executing application. In another embodiment, a user programs the ES control 150*a-c* with the non-precise/precise event identifier.

When the ES control 150*a-c* is programmed with an event identifier, the performance counter 160*a-c* corresponding to the ES control 150*a-c* is incremented or decremented upon each occurrence of the programmed event. The PEBS enable circuit 170*a-c* corresponding to the ES control 150*a-c* and the fixed function performance counter 160*a-c* may be set (e.g., activated, flag set, bit set to 1, etc.) to generate a PEBS record upon overflow of the fixed function performance counter 160*a-c* or, if the counter is decremented, upon the fixed function performance counter 160*a-c* reaching a value of 0. In one embodiment, the PEBS enable bits illustrated in FIG. 8 are set to enable the PEBS handler circuit 108 to generate a PEBS record upon overflow or zero value of the fixed function performance counter 160*a-c* that is counting the event. As discussed above, a PEBS record includes an architectural metadata of a state of the system upon the overflow or zero value of the fixed function performance counter 160*a-c*. The architectural metadata may include, but is not limited to, an IP, TSC, or register state, for example.

Exemplary Control Register for Fixed-Function Counters

Figure 9:
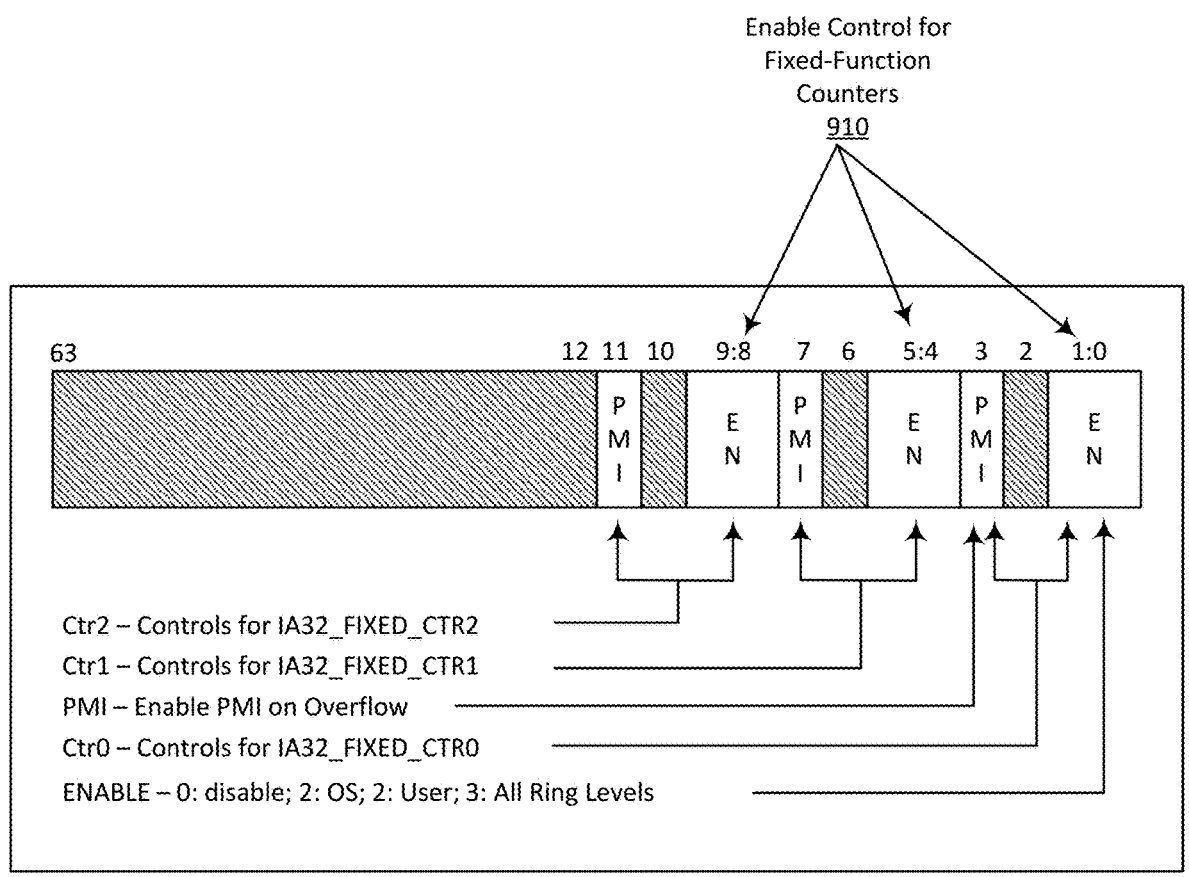
FIG. 9 illustrates different registers for enabling event-based sampling on a fixed function counter in accordance with an embodiment.

FIG. 9 illustrates an alternative MSR layout used for ES controls for fixed counters. In this embodiment, the layout of event select control 150*a-c* is implemented in a combined MSR as shown in FIG. 9. Because they are fixed counters, there are no events to be programmed and there are not even different MSRs for each counter (i.e., as each counter always counts only one thing there is no event select or unit mask). The PEBS enable circuit 910 is shown for three fixed counters (IA32_FIXED_CTR0, IA32_FIXED_CTR1, and IA32_FIXED_CTR2). In one embodiment, the ENABLE is a 2 bit value associated with each counter which is to be set to values of 0 (disable), 1 (OS control), 2 (User control), and 3 (control at all ring levels). In this embodiment, there is limited control associated with each counter due to some of the other logic required to be programmed (such as a ring level mask and PMI enable).

In one embodiment, the NPEBS handler circuit 106 is coupled to the PEBS enable circuit 170*a-c* such that when the fixed function performance counter 160*a-c* overflows or reaches a zero value, the NPEBS handler circuit 106 causes the PEBS enable circuit 170*a-c* to generate the PEBS record for the event. In some embodiments, the NPEBS handler circuit 106 controls timing of generation of the PEBS record for the event. For example, in one embodiment, the NPEBS handler circuit 106 causes the PEBS enable circuit 170*a-c* to generate the PEBS record for the event immediately upon occurrence of the overflow or zero value of the performance counter 160*a-c*, tracking and counting the programmed event.

In another embodiment, the NPEBS handler circuit 106 causes the PEBS enable circuit 170*a-c* to generate the PEBS record for the event immediately after the occurrence of the overflow or zero value of the fixed function performance counter 160*a-c*, tracking and counting the programmed event. In this embodiment, the PEBS record is generated after the next instruction that retires (i.e., after completion of the next instruction in the instruction trace that triggered the fixed function performance counter 160*a-c* to overflow or run to zero). In one embodiment, the PEBS record generated for the event by PEBS handler circuit 108 is stored in memory storage 110 of the PEBS handler circuit 108. Accordingly, the architectural metadata associated with the event may be captured without utilizing a PMI.

In one embodiment, the PMI component 112 collects the PEBS records stored in the memory storage(s) 110*a*-110*n* of PEBS handler circuit 108. The PMI component 112 may immediately collect the PEBS records stored in the memory storage 110*a*-110*n*. In another embodiment, the PMI component 112 is delayed in collecting the PEBS records in memory storage 110*a*-110*n* at once. The interface may be provided as an MSR.

Applying PEBS/NPEBS/PDIR to the fixed function counters 160*a-c* provides similar benefits as adding those features to the general-purpose counters 116*a-n*, but allows for the freedom to use the general-purpose counters for other activities. These and other benefits and additional features of the embodiments of the invention are discussed below.

Exemplary Process for Generating and Storing Pebs Records

Figure 2:
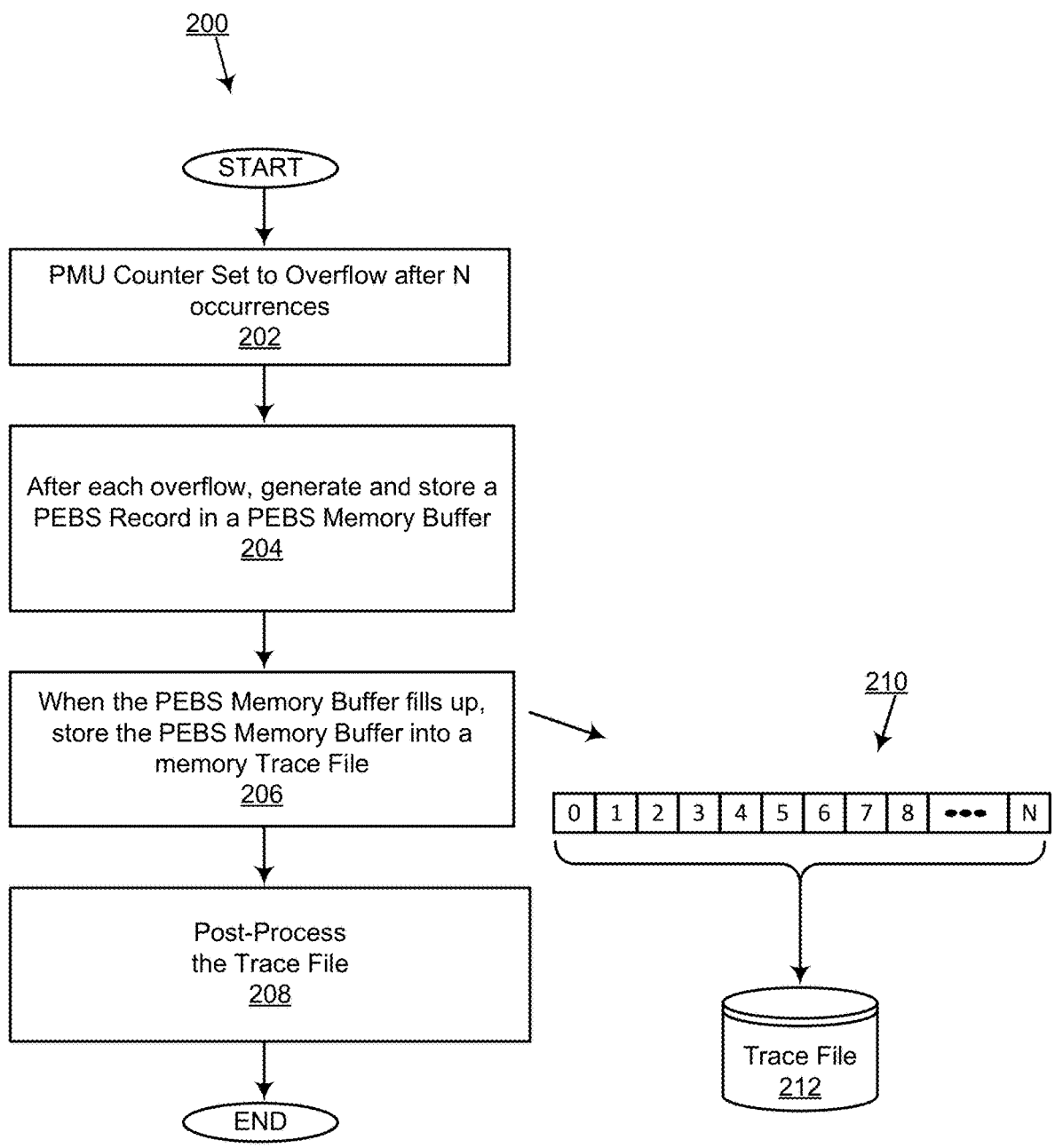
FIG. 2 illustrates an embodiment of a method to generate and store PEBS records in a memory buffer, and to store the memory buffer to a PEBS trace file.

FIG. 2 illustrates an embodiment of a process to generate and store PEBS records in a memory buffer, and to store the memory buffer to a PEBS trace file. After starting, at 202 a PMU counter is set to −N. Starting at a negative value, the PMU counter in this embodiment is to be incremented every time a PEBS record is generated, until it reaches zero (0). In an alternate embodiment, not shown, the PMU counter is set to +N, and decremented every time a PEBS record is generated. At 204, N PEBS records are generated and stored in a PEBS memory buffer. At 206, the N PEBS records are stored in a PEBS trace file. This step is also illustrated as 210, showing N PEBS records being stored in a PEBS trace file 212. At 208, the PEBS trace file is post-processed, after which the process ends.

Figure 3:
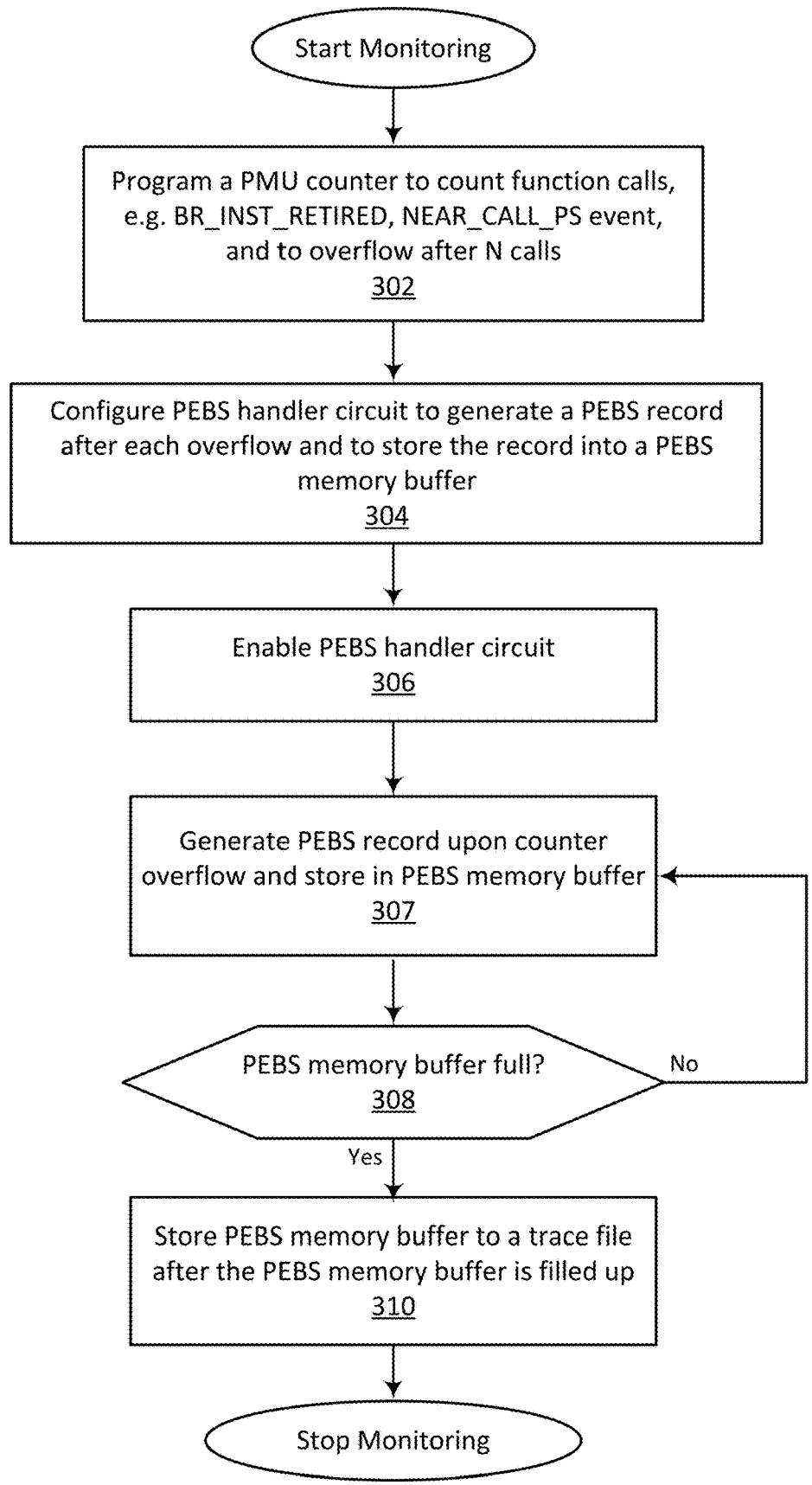
FIG. 3 illustrates an embodiment of a method of programming a PEBS handler circuit to monitor processor performance and generate PEBS record to be stored in a PEBS memory buffer, and then stored in a PEBS trace file.

FIG. 3 illustrates an embodiment of a process of programming a PEBS handler circuit to monitor processor performance and generate a PEBS record to be stored in a PEBS memory buffer, and then stored in a PEBS trace file. After starting, at 302 a PMU counter is programmed to count function calls, such as BR_INST_RETIRED and NEAR_CALL_PS event, and to overflow after N calls. At 304, the PEBS handler circuit is programmed to generate, after each overflow, a PEBS record configured to contain architectural metadata including state information of the processor including, but not limited to, an instruction pointer, a time stamp counter, and register state, as well as performance cost. Configuration of the processor information monitored by PEBS and stored in a PEBS data record is illustrated in FIG. 6, FIG. 8, and FIG. 9, and discussed below. At 306, the PEBS handler circuit is enabled. At 307, upon a counter overflow, a PEBS record is generated and stored in a PEBS memory buffer. At 308, it is determined whether the PEBS memory buffer is full. At 310, after the PEBS memory has been filled up, the PEBS memory contents are stored to a PEBS trace file. The process then ends.

Exemplary Method and Hardware/Firmware to Add Performance Cost to Pebs Records

Figure 4:
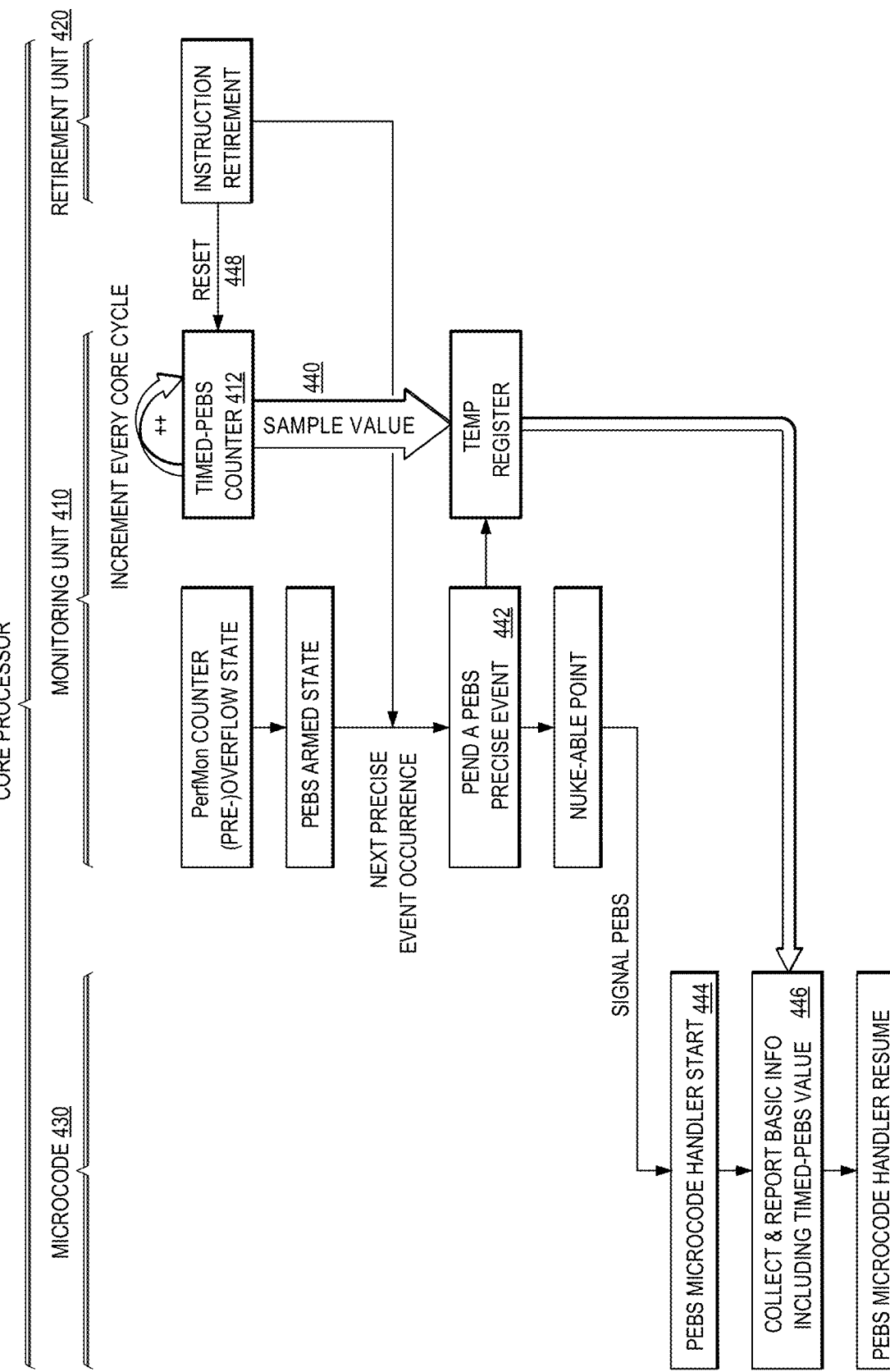
FIG. 4 illustrates an embodiment of a method using a hardware and firmware to add performance cost to PEBS records.

FIG. 4 illustrates an embodiment of a method using a hardware and firmware to add performance cost to sampling (e.g., PEBS) records. As shown in FIG. 4, PMU 410 (which may include any or all of the blocks shown in processor 102 as shown in FIG. 1 and/or correspond to a PMU according to the description of FIG. 1), retirement unit 420, and firmware/microcode 430 collaborate in order to provide the performance cost. One or more timed counters (e.g., 412 and/or timed PEBS counters 117a-117n in FIG. 1) may be included in a PMU to count the duration between retirement of instructions.

At 440, the counter value may be sampled when (at 442) sampling (e.g., PEBS) is pended (and right before its reset due to the same instruction retirement). At 446, microcode may read this sampled value and write it to the memory resident record similar to how it reports other information such as the IP.

In embodiments, the timed counter may be a 16-bit counter added to a reorder buffer (ROB) such that it may measure time by counting clock cycles (e.g., MCLKs) between retirement of instructions. For example, at 448, it may be reset when an instruction retires (e.g., EOM flow marker). In embodiments, it may be enabled/disabled based on one or more settings and/or indicators to enable/disable sampling (e.g., PEBS) and/or performance monitoring (e.g., PMonThreadsActive is set). In embodiments, it may saturate at all ones.

In embodiments, the ROB may save a snapshot of the timed counter to a per-thread register (e.g., a control register) when sampling (e.g., for a corresponding event) is pended, cleared (e.g., MoNukeOnPebs), and/or both (e.g., the earliest of them). In embodiments, at 444, microcode may be invoked to store that register's value to the corresponding record.

FIG. 6 shows an example of a PEBS record including timed PEBS cost according to an embodiment.

Embodiments may be used, for example, in:

Top-down Microarchitectural Analysis (TMA), e.g. to fix heuristics (as indicated by the marked entries in the TMA tree of FIG. 7) including:

L3_Hit_Latency=X*MEM_LOAD_RETIRED.L3_HIT/ CLKS, where X is a heuristic that may vary significantly in mesh servers DTLB_Load uses X cycles STLB hit cost fixed-cost heuristics, e.g., MEM_LOAD*RETIRED.*

Branch Misprediction cost per-instance

DSB-miss penalty per-instance

Cost of any instruction (fixed counter 0)

Exemplary Processor Register File

FIG. 5 is a block diagram of a register architecture 500 according to one embodiment of the invention. In the embodiment illustrated, there are 32 vector registers 510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 515—in the embodiment illustrated, there are 8 write mask registers (k0 through k7), each 64 bits in size. In an alternate embodiment, the write mask registers 515 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 545, on which is aliased the MMX packed integer flat register file 550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention use wider or narrower registers. Additionally, some embodiments of the invention use more, less, or different register files and registers.

Exemplary Pebs Memory Buffer

Figure 10:
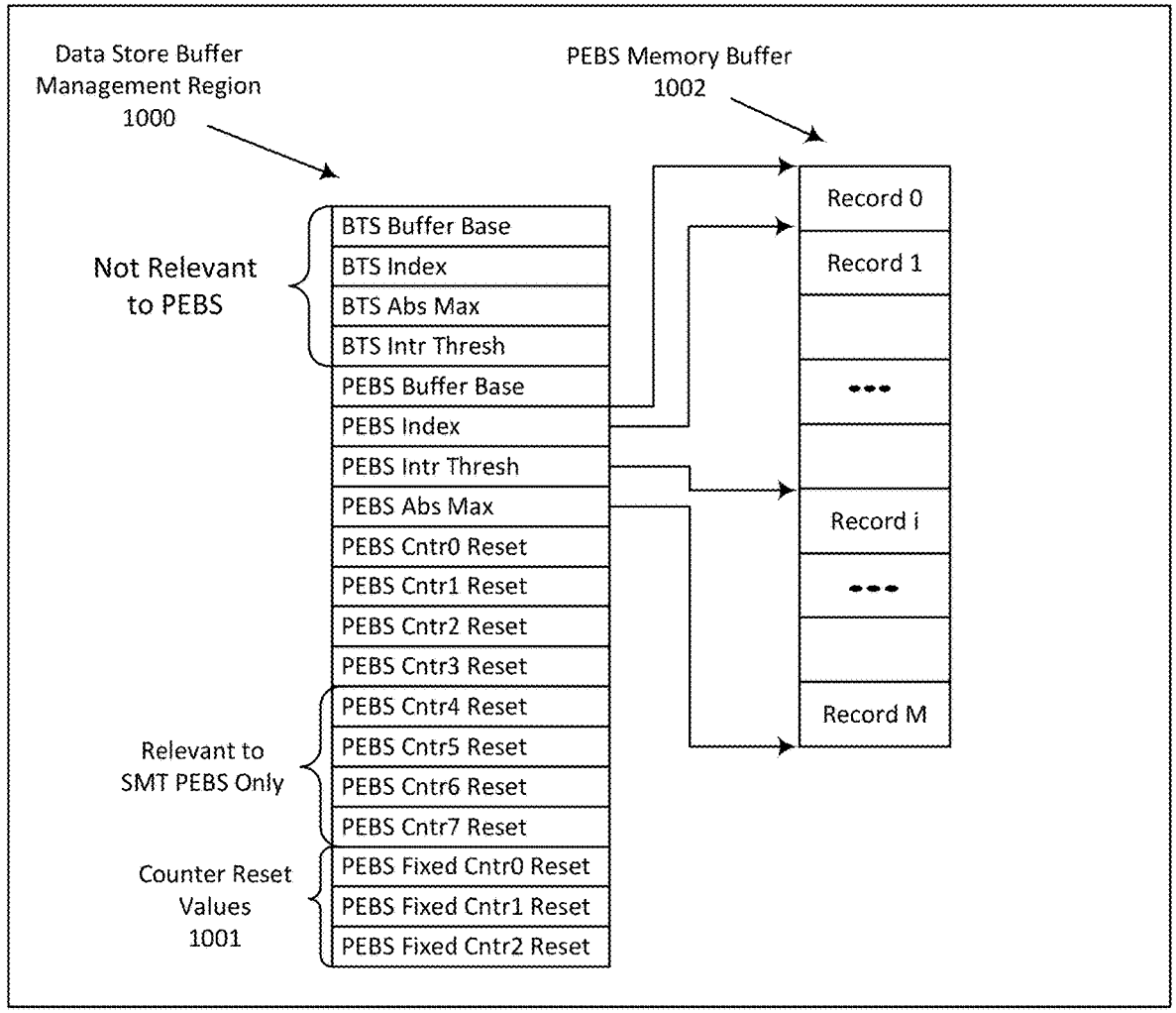
FIG. 10 illustrates updates to a data store buffer management region in accordance with an embodiment.

FIG. 10 illustrates updates to a data store buffer management region in accordance with one embodiment. FIG. 10 illustrates additional details of one embodiment of the invention in which the data store buffer management region 1000 is extended to include counter reset values 1001 for fixed counters Fixed Cntr0, Fixed Cntr1 and Fixed Cntr2 (similar to fixed function counters 160a-c of FIG. 1). To sample every "Nth" event, a reset value of "-N" may be specified by these values and programmed into the fixed counter as well as into a memory-based control block location associated with the counter. When the counter reaches 0, and after a slight pipeline delay (in which additional events may occur), the next event causes a sample to be taken. As illustrated, each event that causes a sample to be taken results in a PEBS record being generated and stored in PEBS memory buffer 1002. Afterward, the counter is reset again with "-N" from the counter reset values 1001 (as execution and counting continue). As shown, successive PEBS records, record 0 to record M, are written to PEBS memory buffer 1002. In some embodiments, when a predetermined threshold number of PEBS records are written to the PEBS memory buffer, the contents of the PEBS memory buffer are copied to a PEBS trace file in memory. The PEBS trace file may be stored in the same memory as the PEBS memory buffer 1002, or to a different memory. In some embodiments, the PEBS memory buffer 1002 is stored in a second memory. In some embodiments, the second memory has a larger capacity than the first memory.

In some embodiments, the sample is collected using a combination of hardware and microcode, and does not require an interrupt or any macrocode execution. Once the buffer fills to a predefined threshold, a Performance Monitoring Interrupt (PMI) is taken, and a macrocode handler is invoked to process the samples in the buffer.

In one embodiment, Non-Precise Event Based Sampling (NPEBS) uses the same debug store mechanism as PEBS to periodically store a set of architectural state information, but with a slightly different semantic. The same sampling control mechanism is used, but the sample is taken at the next opportunity after the counter reaches 0. It is considered "non-precise" because the sampled instruction may not be the one that experienced the event. NPEBS is engaged when PEBS is configured for an event that is not part of the PEBS-able event list such as Reference Clocks and Core Clocks. In the embodiments described above, it is implemented on general purpose counters 116*a-n*. Without NPEBS, the only way to get statistical samples based on clock events is to take a costly PMI each time an appropriately configured counter overflows.

In summary, the embodiments of the invention provide for the extension of the PEBS enable machine specific register 800 (e.g., IA32_PEBS_ENABLE MSR), the data store buffer management region 1000, and associated hardware control registers to include state bits in for the fixed counters 160*a-c*. These embodiments allow all fixed events to set the corresponding PEBS_ENABLE bit so that they can utilize the PEBS triggering mechanism and buffer when they have hit the input sample after value, either using PEBS or NPEBS as described above. For reference and core clocks, the fixed events are not guaranteed to tag to any particular instruction but will allow the clock events to utilize the PEBS buffer to store all information already available through PEBS on that architecture such as Instruction Pointer (RIP/EIP), timestamp counter (TSC) and general purpose registers. In addition, in one embodiment, hardware in the exception generation logic takes the additional inputs and appropriately inserts the PEBS assist operations. In one embodiment, the fixed counter 160 utilizes the PEBS triggering mechanism. Consequently, fixed events can program the PEBS enable machine specific register 800 and enable PEBS for those non-precise events.

Exemplary Advantages of Tracking Pebs Events Independently of Interrupts

Figure 11A:
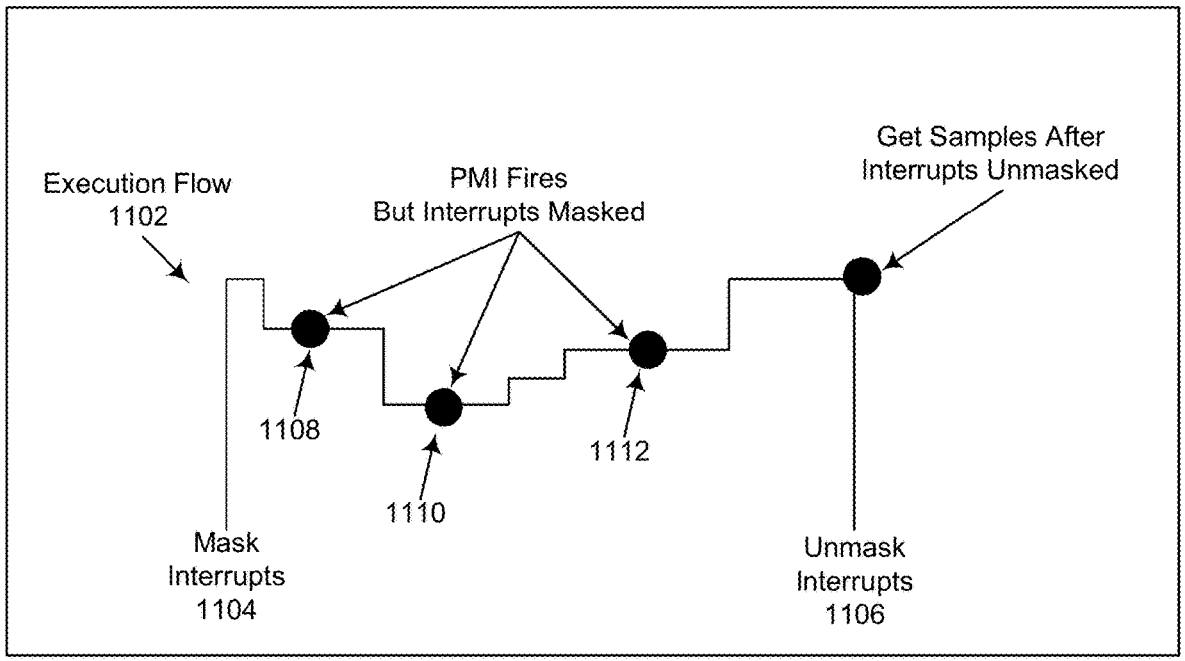
FIG. 11A illustrates improvements to performance monitoring realized by embodiments of the invention.
Figure 11B:
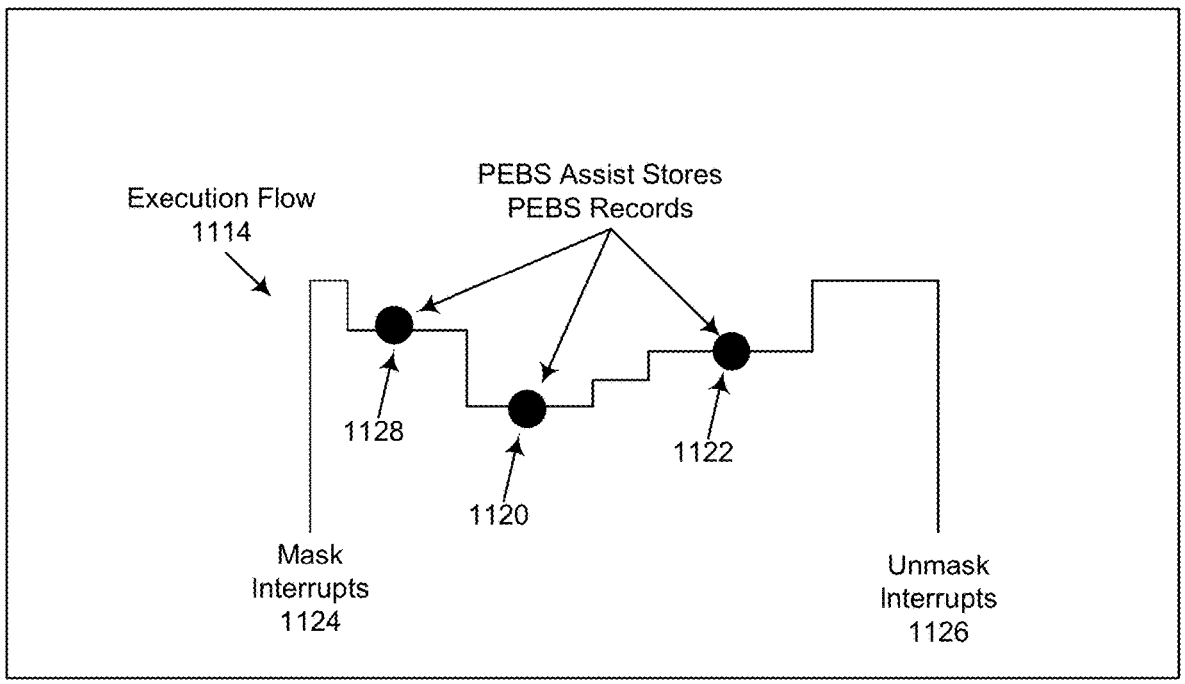
FIG. 11B illustrates improvements to performance monitoring realized by embodiments of the invention.

FIGS. 11A-B illustrate improvements to performance monitoring realized by embodiments of the invention. FIG. 11A illustrates sampling without PEBS and where PMIs are not mapped to NMIs. The end result is an inaccurate profile where the entire profile may be missed and samples may be dropped. In contrast, FIG. 11B illustrates event based sampling on fixed events utilizing PEBS sampling techniques as described herein. The result is significantly greater accuracy and sample collection upon the occurrence of events.

Exemplary System Architecture

Figure 12:
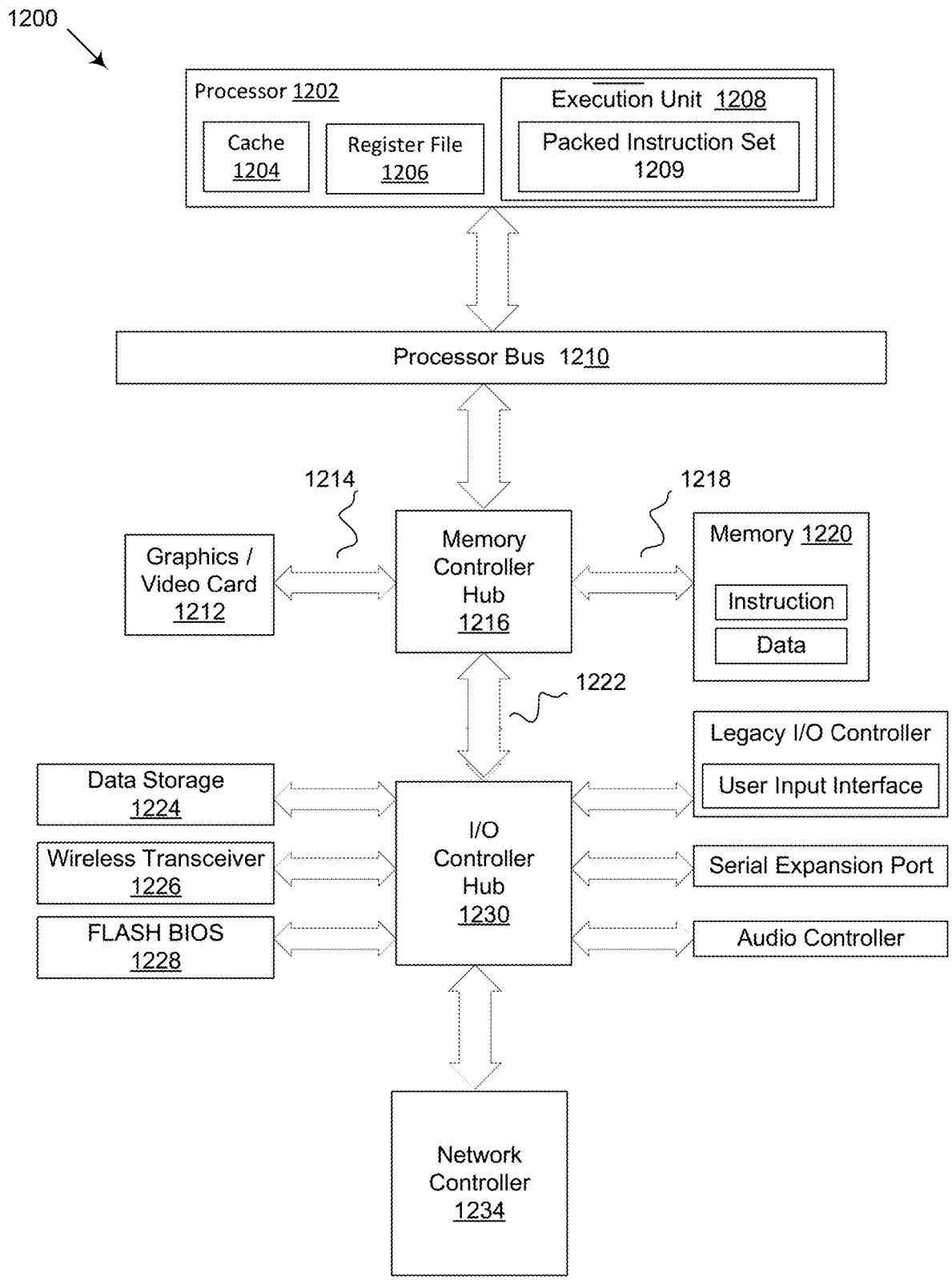
FIG. 12 is a block diagram of an exemplary computer system formed with a processor that include execution units to execute an instruction in accordance with embodiments of the present disclosure.

FIG. 12 is a block diagram of an exemplary computer system formed with a processor that includes execution units to execute an instruction in accordance with embodiments of the present disclosure. System 1200 may include a component, such as a processor 1202 to employ execution units including logic to perform algorithms for process data, in accordance with the present disclosure, such as in the embodiment described herein. System 1200 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, system 1200 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

System 1200 may include a processor 1202 that may include one or more execution units 1208 to perform an algorithm to perform at least one instruction in accordance with one embodiment of the present disclosure. One embodiment may be described in the context of a single processor desktop or server system, but other embodiments may be included in a multiprocessor system. System 1200 may be an example of a 'hub' system architecture. System 1200 may include a processor 1202 for processing data signals. Processor 1202 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 1202 may be coupled to a processor bus 1210 that may transmit data signals between processor 1202 and other components in system 1200. The elements of system 1200 may perform conventional functions that are well known to those familiar with the art.

In one embodiment, processor 1202 may include a Level 12 (L1) internal cache memory 1204. Depending on the architecture, the processor 1202 may have a single internal cache or multiple levels of internal cache. In another embodiment, the cache memory may reside external to processor 1202. Other embodiments may also include a combination of both internal and external caches depending on the particular implementation and needs. Register file 1206 may store different types of data in various registers including integer registers, floating point registers, status registers, and instruction pointer register.

Execution unit 1208, including logic to perform integer and floating point operations, also resides in processor 1202. Processor 1202 may also include a microcode (ucode) ROM that stores microcode for certain macroinstructions. In one embodiment, execution unit 1208 may include logic to handle a packed instruction set 1209. By including the packed instruction set 1209 in the instruction set of processor 1202, along with associated circuitry to execute the instructions, the operations used by many multimedia applications may be performed using packed data in processor 1202. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 1208 may also be used in micro controllers, embedded processors, graphics devices, DSPs, and other types of logic circuits. System 1200 may include a memory 1220. Memory 1220 may be implemented as a dynamic random access memory (DRAM) device, a static random access memory (SRAM) device, flash memory device, or other memory device. Memory 1220 may store instructions and/or data represented by data signals that may be executed by processor 1202.

A Memory Controller Hub 1216 may be coupled to processor bus 1210 and memory 1220. Memory Controller Hub 1216 may include a memory controller hub (MCH). Processor 1202 may communicate with Memory Controller Hub 1216 via a processor bus 1210. Memory Controller Hub 1216 may provide a high bandwidth memory path 1218 to memory 1220 for instruction and data storage and for storage of graphics commands, data and textures. Memory Controller Hub 1216 may direct data signals between processor 1202, memory 1220, and other components in system 1200 and to bridge the data signals between processor bus 1210, memory 1220, and Input/Output (I/O) Controller Hub 1230. In some embodiments, the Memory Controller Hub 1216 provides a graphics port for coupling to a graphics/video card 1212. Memory Controller Hub 1216 may be coupled to memory 1220 through a memory interface 1218. Graphics card 1212 may be coupled to Memory Controller Hub 1216 through an Accelerated Graphics Port (AGP) interconnect 1214.

System 1200 may use a proprietary hub interface bus 1222 to couple Memory Controller Hub 1216 to I/O controller hub (ICH) 1230. In one embodiment, ICH 1230 may provide direct connections to some I/O devices via a local I/O bus. The local I/O bus may include a high-speed I/O bus for connecting peripherals to memory 1220, chipset, and processor 1202. Examples may include the audio controller, firmware hub (flash BIOS) 1228, wireless transceiver 1226, data storage 1224, legacy I/O controller containing user input and keyboard interfaces, a serial expansion port such as Universal Serial Bus (USB), and a network controller 1234. Data storage 1224 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Exemplary System Architectures

Figure 13:
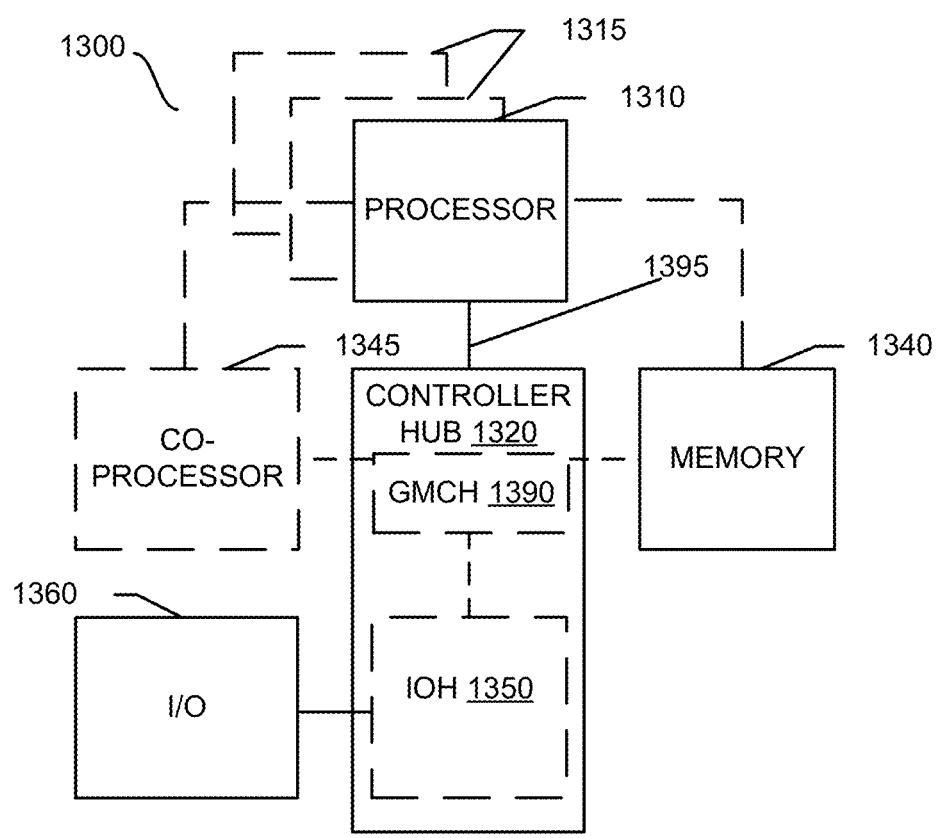
FIG. 13 is a block diagram of a first more specific exemplary system in accordance with an embodiment of the present invention.
Figure 14:
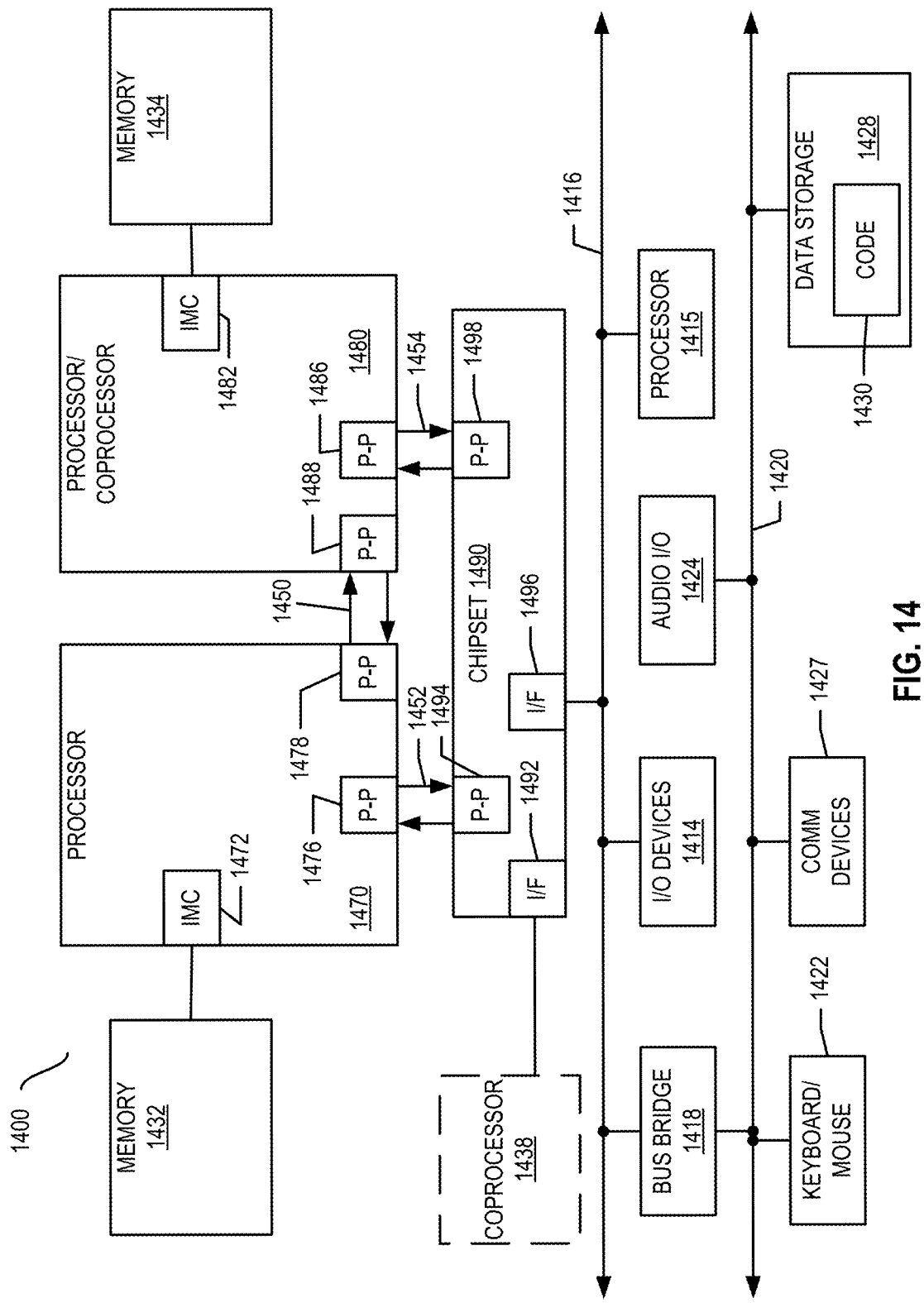
FIG. 14 is a block diagram of a first more specific exemplary system in accordance with an embodiment of the present invention.

FIGS. 13 and 14 are block diagrams of exemplary system architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Referring now to FIG. 13, shown is a block diagram of a system 1300 in accordance with one embodiment of the present invention. The system 1300 may include one or more processors 1310 and 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1700.

The memory 1340 may be, for example, dynamic random access memory (DRAM), phase change memory (PCM), or a combination of the two. For at least one embodiment, the controller hub 1320 communicates with the processors 1310 and 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the processors 1310 and 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Referring now to FIG. 14, shown is a block diagram of a multiprocessor system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processor 1470 and processor 1480 may be some version of the processor 1700. In one embodiment of the invention, processors 1470 and 1480 are respectively processors 1310 and 1315, while coprocessor 1438 is coprocessor 1345. In another embodiment, processor 1470 and processor 1480 are respectively processor 1310 coprocessor 1345.

Processor 1470 and processor 1480 are shown including integrated memory controller (IMC) units 1472 and 1482, respectively. Processor 1470 also includes as part of its bus controller unit point-to-point (P-P) interfaces 1476 and 1478; similarly, second processor 1480 includes P-P interfaces 1486 and 1488. Processor 1470 and processor 1480 may exchange information via a point-to-point (P-P) interconnect 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processor 1470 and processor 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a data storage 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
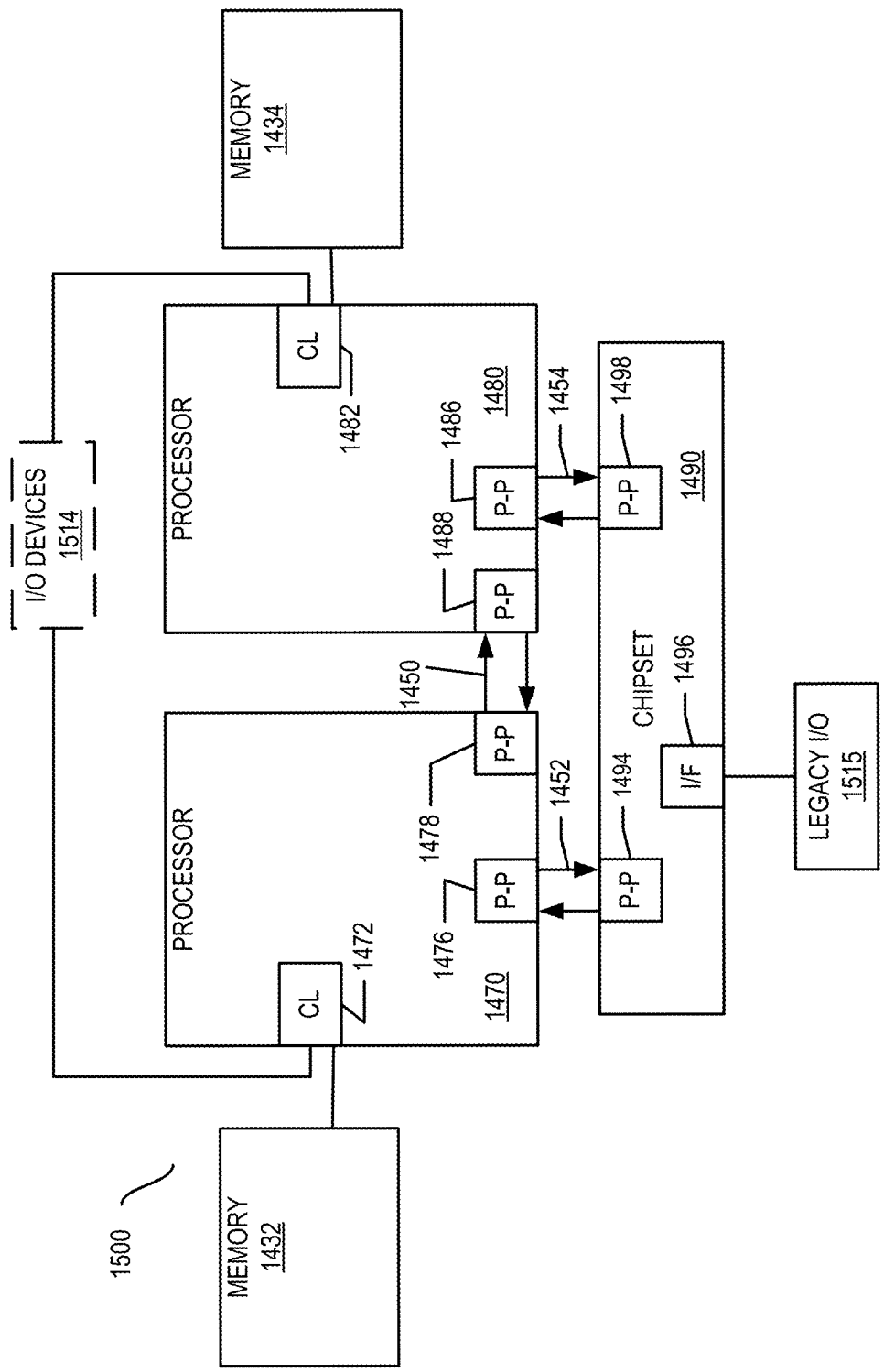
FIG. 15 is a block diagram of a second more specific exemplary system in accordance with an embodiment of the present invention.

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processor 1470 and processor 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
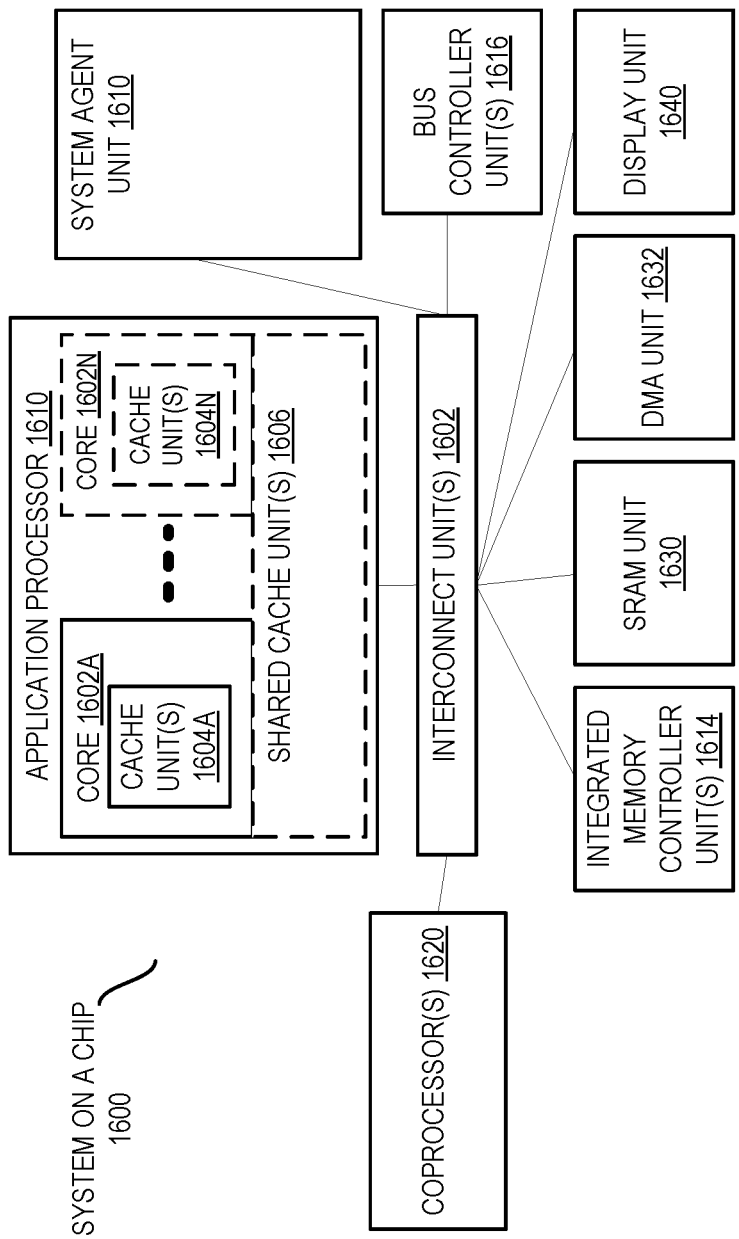
FIG. 16 is a block diagram of a SoC in accordance with an embodiment of the present invention.

Referring now to FIG. 16, shown is a block diagram of a SoC 1600 in accordance with an embodiment of the present invention. Similar elements in FIG. 16 bear like reference numerals. Also, dashed lined boxes are optional features on more advanced SoCs. In FIG. 16, an interconnect unit(s) 1602 is coupled to: an application processor 1610 which includes a set of one or more cores 1602A-N, which include cache units 1604A-N, and shared cache unit(s) 1606; a system agent unit 1610; a bus controller unit(s) 1616; an integrated memory controller unit(s) 1614; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figure 17:
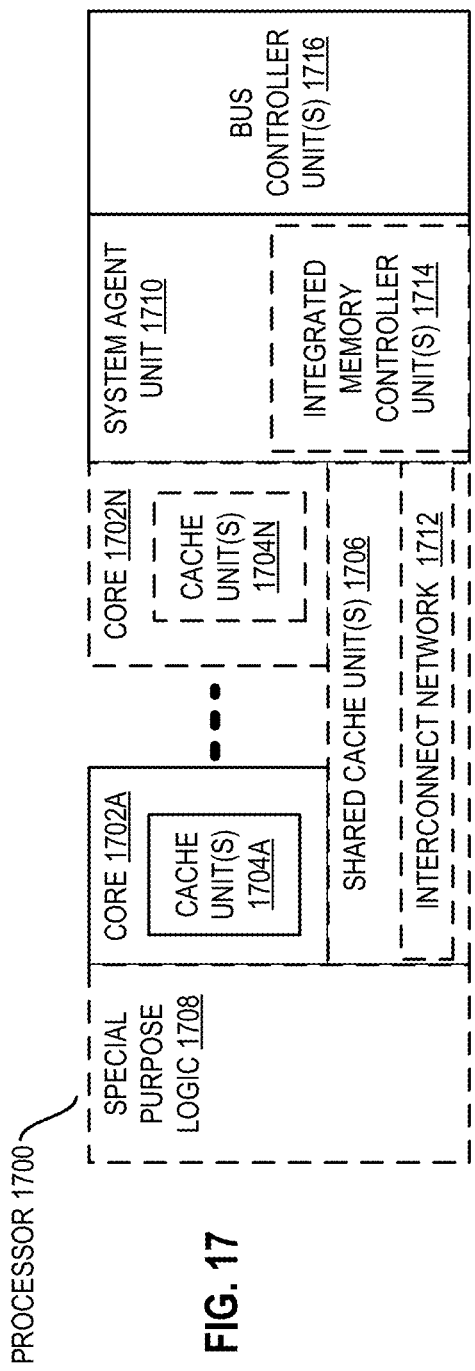
FIG. 17 is a block diagram of a processor that has more than one core, an integrated memory controller, and integrated graphics according to embodiments of the invention.

FIG. 17 is a block diagram of a processor 1700 that may have more than one core, may have an integrated memory controller, and may have integrated graphics according to embodiments of the invention. The solid lined boxes in FIG. 17 illustrate a processor 1700 with a single core 1702A, a system agent 1710, a set of one or more bus controller units 1716, while the optional addition of the dashed lined boxes illustrates an alternative processor 1700 with multiple cores 1702A-N, a set of one or more integrated memory controller unit(s) 1714 in the system agent unit 1710, and special purpose logic 1708.

Thus, different implementations of the processor 1700 may include: 1) a CPU with the special purpose logic 1708 being integrated graphics and/or scientific (throughput) logic (which may include one or more cores), and the cores 1702A-N being one or more general purpose cores (e.g., general purpose in-order cores, general purpose out-of-order cores, a combination of the two); 2) a coprocessor with the cores 1702A-N being a large number of special purpose cores intended primarily for graphics and/or scientific (throughput); and 3) a coprocessor with the cores 1702A-N being a large number of general purpose in-order cores.

Thus, the processor 1700 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1700 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1706, and external memory (not shown) coupled to the set of integrated memory controller units 1714. The set of shared cache units 1706 may include one or more mid-level caches, such as level 2 (L2), level 3 (L3), level 4 (L4), or other levels of cache, a last level cache (LLC), and/or combinations thereof. While in one embodiment a ring based interconnect unit 1712 interconnects the integrated graphics logic 1708 (integrated graphics logic 1708 is an example of and is also referred to herein as special purpose logic), the set of shared cache units 1706, and the system agent unit 1710/integrated memory controller unit(s) 1714, alternative embodiments may use any number of well-known techniques for interconnecting such units. In one embodiment, coherency is maintained between one or more cache units 1706 and cores 1702-A-N.

In some embodiments, one or more of the cores 1702A-N are capable of multi-threading. The system agent 1710 includes those components coordinating and operating cores 1702A-N. The system agent unit 1710 may include for example a power control unit (PCU) and a display unit. The PCU may be or include logic and components needed for regulating the power state of the cores 1702A-N and the integrated graphics logic 1708. The display unit is for driving one or more externally connected displays.

The cores 1702A-N may be homogenous or heterogeneous in terms of architecture instruction set; that is, two or more of the cores 1702A-N may be capable of execution the same instruction set, while others may be capable of executing only a subset of that instruction set or a different instruction set.

Exemplary Computer Architectures
Emulation (Including Binary Translation, Code Morphing, Etc.)

In some cases, an instruction converter is used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 18 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 18 shows a program in a high level language 1802 may be compiled using an x86 compiler 1804 to generate x86 binary code 1806 that may be natively executed by a processor with at least one x86 instruction set core 1816. The processor with at least one x86 instruction set core 1816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1804 represents a compiler that is operable to generate x86 binary code 1806 (e.g., object code) that can, with or without additional linkage processing, be executed on the processor with at least one x86 instruction set core 1816. Similarly, FIG. 18 shows the program in the high level language 1802 may be compiled using an alternative instruction set compiler 1808 to generate alternative instruction set binary code 1810 that may be natively executed by a processor without at least one x86 instruction set core 1814 (e.g., a processor with cores that execute the MIPS instruction set of MIPS Technologies of Sunnyvale, CA and/or that execute the ARM instruction set of ARM Holdings of Sunnyvale, CA). The instruction converter 1812 is used to convert the x86 binary code 1806 into code that may be natively executed by the processor without an x86 instruction set core 1814. This converted code is not likely to be the same as the alternative instruction set binary code 1810 because an instruction converter capable of this is difficult to make; however, the converted code will accomplish the general operation and be made up of instructions from the alternative instruction set. Thus, the instruction converter 1812 represents software, firmware, hardware, or a combination thereof that, through emulation, simulation or any other process, allows a processor or other electronic device that does not have an x86 instruction set processor or core to execute the x86 binary code 1806.

The above examples include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

In the foregoing specification, specific exemplary embodiments have been disclosed. It will, however, be evident that various modifications and changes may be made thereto without departing from the broader spirit and scope of the invention as set forth in the appended claims. The specification and drawings are, accordingly, to be regarded in an illustrative rather than a restrictive sense.

Although some embodiments disclosed herein involve data handling and distribution in the context of hardware execution units and logic circuits, other embodiments can be accomplished by way of a data or instructions stored on a non-transitory machine-readable, tangible medium, which, when performed by a machine, cause the machine to perform functions consistent with at least one embodiment. In one embodiment, functions associated with embodiments of the present disclosure are embodied in machine-executable instructions. The instructions can be used to cause a general-purpose or special-purpose processor that is programmed with the instructions to perform the steps of the at least one embodiment. Embodiments of the present invention may be provided as a computer program product or software which may include a machine or computer-readable medium having stored thereon computer-executable instructions which may be used to program a computer (or other electronic devices) to perform one or more operations according to the at least one embodiment. Alternatively, steps of embodiments may be performed by specific hardware components that contain fixed-function logic for performing the steps, or by any combination of programmed computer components and fixed-function hardware components.

Instructions used to program logic to perform the at least one embodiment can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the non-transitory computer-readable medium includes any type of tangible machine-readable medium suitable for storing or transmitting electronic instructions or information in a form readable by a machine (e.g., a computer).

In an embodiment, a processor includes a first counter, a second counter, a handler circuit, and an enable circuit. The first counter is to count occurrences of an event in the processor and to overflow upon the count of occurrences reaching a specified value. The second counter to measure a performance cost of the event. The handler circuit to generate and an event sampling record. The record is to include at least one value reflecting the performance cost. The enable circuit is to enable the handler circuit to generate the record.

In embodiments, the event sampling record also includes architectural metadata of the apparatus and a register state of the apparatus; the apparatus also includes an event select register to be programmed with an event identifier corresponding to the event and a programmable configuration register to specify contents of the event sampling record; the second counter is to count time between retirement of instructions; the performance cost is to be measured in time; the performance cost is to be measured in a number of elapsed retirement cycles; the performance cost is to be measured at event level granularity; the performance cost is to be measured at instruction level granularity; the performance cost is to be measured in retirement push-out time induced by the event; the retirement push-out time induced by the event is between retirement of instructions; the event is an instruction and the retirement push-out time induced by the event is between execution of the instruction and retirement of the instruction; and/or the event sampling record is a Precise Event Based Sampling record.

In an embodiment, a method includes enabling an event handler sampling circuit to generate an event sampling record, the event sampling record to include at least one value to reflect a performance cost of an event; counting occurrences of the event; providing an indication that a count of occurrences of the event has reached a specified value; and measuring the performance cost of the event. In embodiments, measuring the performance cost of the event is by a counter to count clock cycles between retirement of instructions; the method also include sampling the counter in response to retirement of a first instruction, wherein the first instruction corresponds to a first occurrence of the event; the method also includes resetting the counter in response to retirement of a second instruction, wherein the second instruction corresponds to second occurrence of the event, and/or the event sampling record is a Precise Event Based Sampling record.

In an embodiments, a system includes a memory; and a processor including a first counter to count occurrences of an event in the processor and to overflow upon the count of occurrences reaching a specified value; a second counter to measure a performance cost of the event; an event sampling handler circuit to generate an event sampling record, the record to include at least one value to reflect the performance cost; and an event sampling enable circuit coupled to the first counter, the second counter, and the event sampling handler circuit, wherein the event sampling enable circuit is to enable the event sampling handler circuit to generate the event sampling record. In embodiments, the event sampling handler circuit is also to store the event sampling record in the memory; and/or the event sampling record is a Precise Event Based Sampling record.

In embodiments, an apparatus may include means for performing any function disclosed herein. In embodiments, an apparatus may comprise a data storage device that stores code that when executed by a hardware processor causes the hardware processor to perform any method disclosed herein. An apparatus may be as described in the detailed description. A method may be as described in the detailed description. In embodiments, a non-transitory machine-readable medium may store code that when executed by a machine causes the machine to perform a method comprising any method disclosed.

What is claimed is:

1. An apparatus, comprising:
    a processor to execute instructions associated with an event of the processor, wherein a first instruction of the instructions corresponds to a first occurrence of the event;
    a memory buffer, wherein the memory buffer is stored to a trace file after the memory buffer is full;
    a first counter circuit;
    an event sampling handler circuit to store, in response to an overflow of the first counter circuit, an event sampling record including an instruction pointer and a value in the memory buffer, wherein the instruction pointer corresponds to the event and the value corresponds to a time between retirement of the instructions;
    a second counter circuit associated with the time, wherein the second counter circuit is reset in response to retirement of a second instruction of the instructions, wherein the second instruction corresponds to a second occurrence of the event; and
    an event sampling enable circuit coupled to the first counter circuit, the second counter circuit, and the event sampling handler circuit, wherein the event sampling enable circuit is to enable the event sampling handler circuit.

2. The apparatus of claim 1, wherein the event sampling record further comprises architectural metadata of the apparatus and a register state of the apparatus.

3. The apparatus of claim 2, further comprising:
    an event select register to be programmed with an event identifier corresponding to the event; and
    a programmable configuration register to store contents of the event sampling record.

4. The apparatus of claim 2, wherein the architectural metadata comprises a time stamp counter.

5. The apparatus of claim 1, wherein the event sampling record is a Precise Event Based Sampling record.

6. The apparatus of claim 1, wherein the time is a number of clock cycles between the retirement of the instructions.

7. The apparatus of claim 1, wherein the time represents a performance cost of the event.

8. A method executed by a processor comprising:
    executing instructions associated with an event of the processor, wherein a first instruction of the instructions corresponds to a first occurrence of the event;
    enabling an event sampling handler circuit with an event sampling enable circuit associated with the processor to store, in response to an overflow of a first counter circuit associated with the processor, an event sampling record including an instruction pointer and a value in a memory buffer, wherein the instruction pointer corresponds to the event, the value corresponds to a time between retirement of the instructions, and the time is associated with a second counter circuit;
    providing an indication of the overflow;
    resetting the second counter circuit in response to retirement of a second instruction of the instructions, wherein the second instruction corresponds to a second occurrence of the event; and
    storing the memory buffer to a trace file after the memory buffer is full.

9. The method of claim 8, wherein the time is a number of clock cycles between the retirement of the instructions.

10. The method of claim 8, wherein the event sampling record is a Precise Event Based Sampling record.

11. The method of claim 8, wherein the event sampling record further comprises architectural metadata and a register state.

12. The method of claim 11, wherein the architectural metadata comprises a time stamp counter.

13. The method of claim 11, further comprising:
    programming an event select register with an event identifier corresponding to the event; and
    storing contents of the event sampling record in a programmable configuration register.

14. The method of claim 8, wherein the time represents a performance cost of the event.

15. A system comprising:
    a memory buffer, wherein the memory buffer is stored to a trace file after the memory buffer is full; and
    a processor to execute instructions associated with an event of the processor, wherein a first instruction of the instructions corresponds to a first occurrence of the event, the processor comprising:

a first counter circuit an event sampling handler circuit to store, in response to an overflow of the first counter circuit, an event sampling record including an instruction pointer and a value in the memory buffer, wherein the instruction pointer corresponds to the event and the value corresponds to a time between retirement of the instructions;

a second counter circuit associated with the time, wherein the second counter circuit is reset in response to retirement of a second instruction of the instructions, wherein the second instruction corresponds to a second occurrence of the event; and an event sampling enable circuit coupled to the first counter circuit, the second counter circuit, and the event sampling handler circuit, wherein the event sampling enable circuit is to enable the event sampling handler circuit.

16. He system of claim 15, wherein the event sampling record further comprises architectural metadata of the system and a register state of the system.

17. The system of claim 16, wherein the architectural metadata comprises a time stamp counter.

18. The system of claim 16, further comprising:

an event select register to be programmed with an event identifier corresponding to the event, and a programmable configuration register to store contents of the event sampling record.

19. The system of claim 15, wherein the event sampling record is a Precise Event Based Sampling record.

20. The system of claim 15, wherein the time is a number of clock cycles between the retirement of the instructions.

* * * * *